US006424979B1

(12) United States Patent
Livingston et al.

(10) Patent No.: US 6,424,979 B1
(45) Date of Patent: Jul. 23, 2002

(54) SYSTEM FOR PRESENTING AND MANAGING ENTERPRISE ARCHITECTURES

(75) Inventors: Eric Bruce Livingston, Fairfax, VA (US); Lisa Conners Vogt, Bethesda, MD (US); Stephen David Gantz; David Samuel Zipkin, both of Arlington, VA (US); Matthew Todd Richards, Vienna, VA (US); Sheila Caroline Rocchio, Arlington, VA (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/223,018

(22) Filed: Dec. 30, 1998

(51) Int. Cl.[7] .............................................. G06F 17/00
(52) U.S. Cl. ..................... 707/511; 707/203; 707/501.1
(58) Field of Search ............................ 707/10, 1, 2, 3, 707/100, 101, 104, 9, 104.1, 501.1, 203, 511; 709/202; 714/100

(56) References Cited

U.S. PATENT DOCUMENTS

| | | | |
|---|---|---|---|
| 5,263,129 A | | 11/1993 | Ikegaya et al. |
| 5,273,434 A | | 12/1993 | Peck |
| 5,311,424 A | * | 5/1994 | Mukherjee et al. ............ 705/29 |
| 5,317,729 A | * | 5/1994 | Mukherjee et al. ............. 707/3 |
| 5,455,407 A | * | 10/1995 | Rosen ......................... 235/380 |
| 5,737,739 A | | 4/1998 | Shirley et al. |
| 5,842,196 A | * | 11/1998 | Agarwal et al. ................ 707/2 |
| 5,862,346 A | * | 1/1999 | Kley et al. ................... 709/200 |
| 5,907,837 A | * | 5/1999 | Ferrel et al. ................... 707/3 |
| 5,949,876 A | * | 9/1999 | Ginter et al. .................. 380/4 |
| 5,970,476 A | * | 10/1999 | Fahey .......................... 705/28 |
| 6,067,559 A | * | 5/2000 | Allard et al. ................ 709/202 |
| 6,078,924 A | * | 6/2000 | Ainsbury et al. ........... 707/101 |
| 6,085,220 A | * | 7/2000 | Courts et al. ............... 709/201 |
| 6,119,229 A | * | 9/2000 | Martinez et al. ............ 713/200 |
| 6,151,601 A | * | 11/2000 | Papierniak et al. ........... 707/10 |
| 6,157,915 A | * | 12/2000 | Bhaskaran et al. ............ 705/7 |
| 6,182,091 B1 | * | 1/2001 | Pitkow et al. .............. 707/501 |

OTHER PUBLICATIONS

E. James Whitehead, Jr. "World Wide Web distributed authoring and versioning (WebDAV): an introduction", StandardView vol. 5, No. 1, Mar. 1997, pp. 3–8.*
U.S. patent application Ser. No. 09/222,831, Baxter et al., filed Dec. 30, 1998.
Extensible Markup Language (XML) 1.0, W3C Recommendation Feb. 10, 1998.
Texcel International A.B., Texcel Information Manager Release 2.0 Product Brief, 1998.
Delphi Consulting Group, Delphi Opinion, Astoria 3.0 Chrystal Software, Jun. 1998.
Arbortext, Inc., Introducting Epic™ An Enterprise Solution for the Product Information Chain, 1998.
Microstar Software Inc., Content Management Systems.
AIS Software, Application Sheet, Merging XML Content with Relational Databases On–line Catalog Publishing with Dual Prism.
AIS Software, News Release, DUAL PRISM™ Now Shipping!, Official Launch of Dual Prism in North America at XML Chicago 1998, Oct. 1998.
AIS Software, Dual Prism® Powerful Web Content Management and Online Delivery.

* cited by examiner

Primary Examiner—Safet Metjahic
Assistant Examiner—Uyen Le
(74) Attorney, Agent, or Firm—Staas & Halsey LLP

(57) ABSTRACT

A system providing views of a technical architecture of an enterprise that take into account the content type interest, level of detail and time frame of desired information. A user, with a browser interface, selects a portal specifying the type of content to be viewed. A profile of the user indicates the level of detail and time frame of information to be obtained. The interface provides the user's selection of desired information within the portal in the form of a page request that is converted into queries of a database that seek content satisfying the type, level of detail and time frame attributes of the request. The content is formed into a web page and provided to the interface by the web server. Content is separated into atomic units allowing the information to be rearranged responsive to each user's needs.

28 Claims, 26 Drawing Sheets

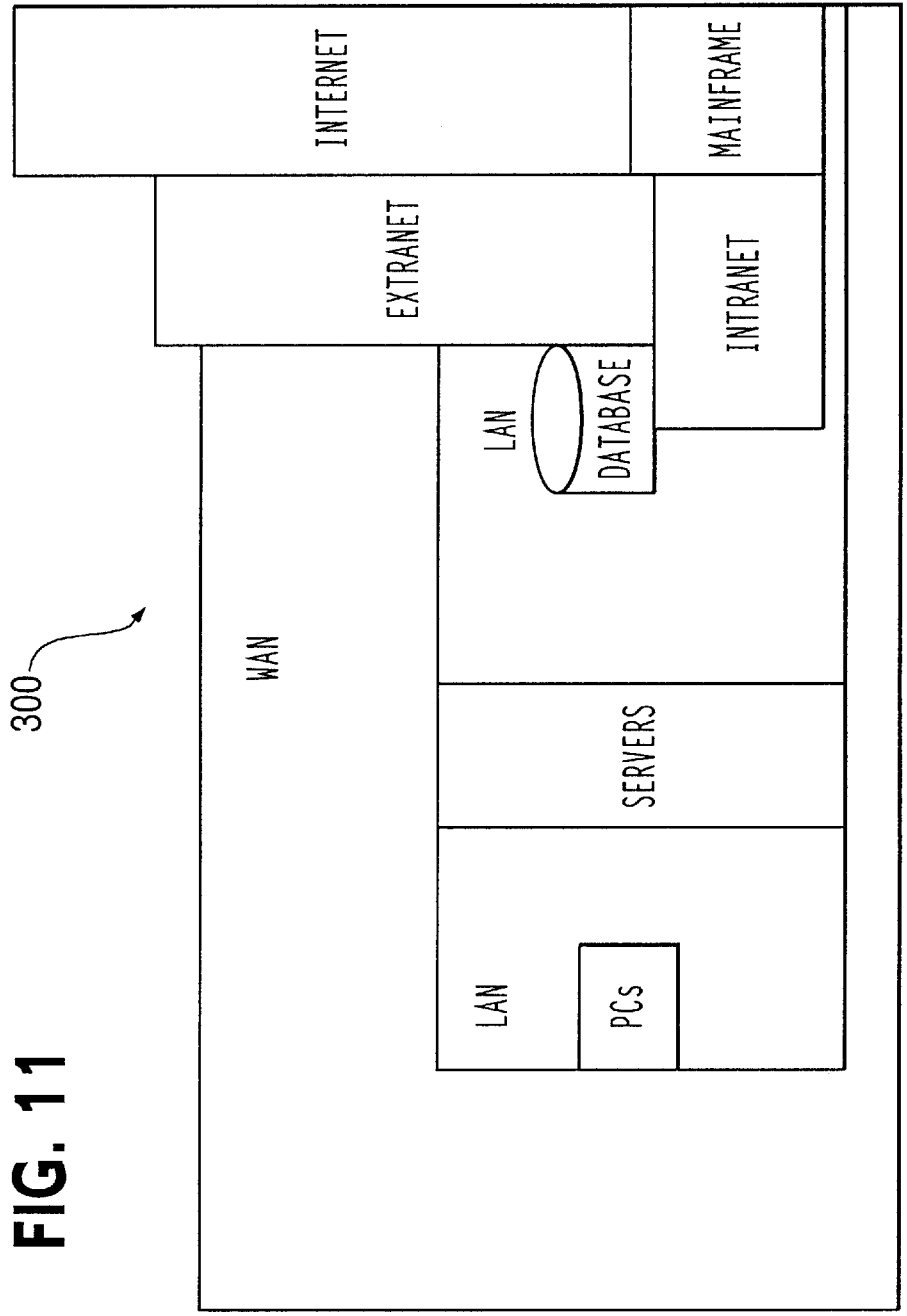

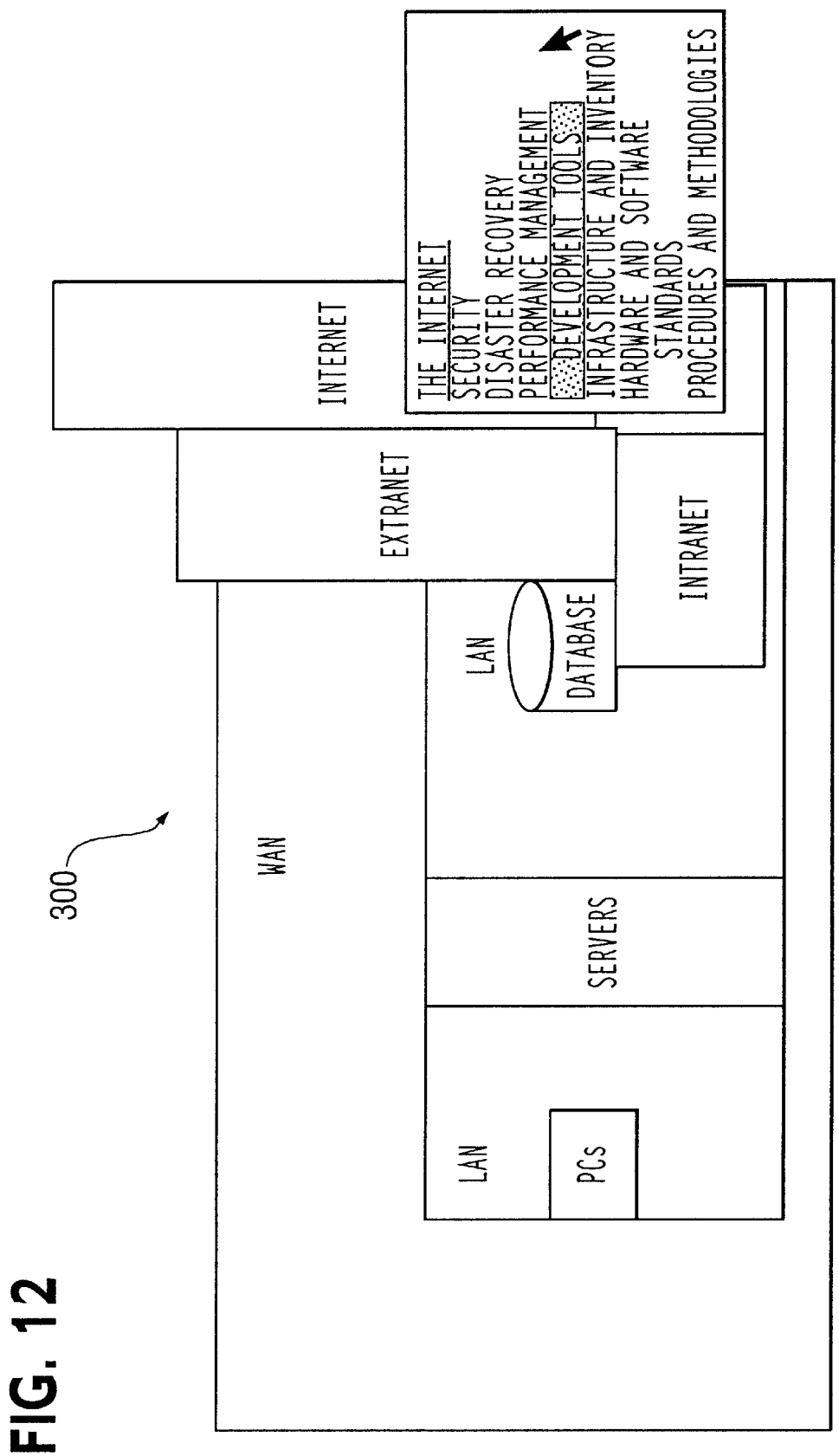

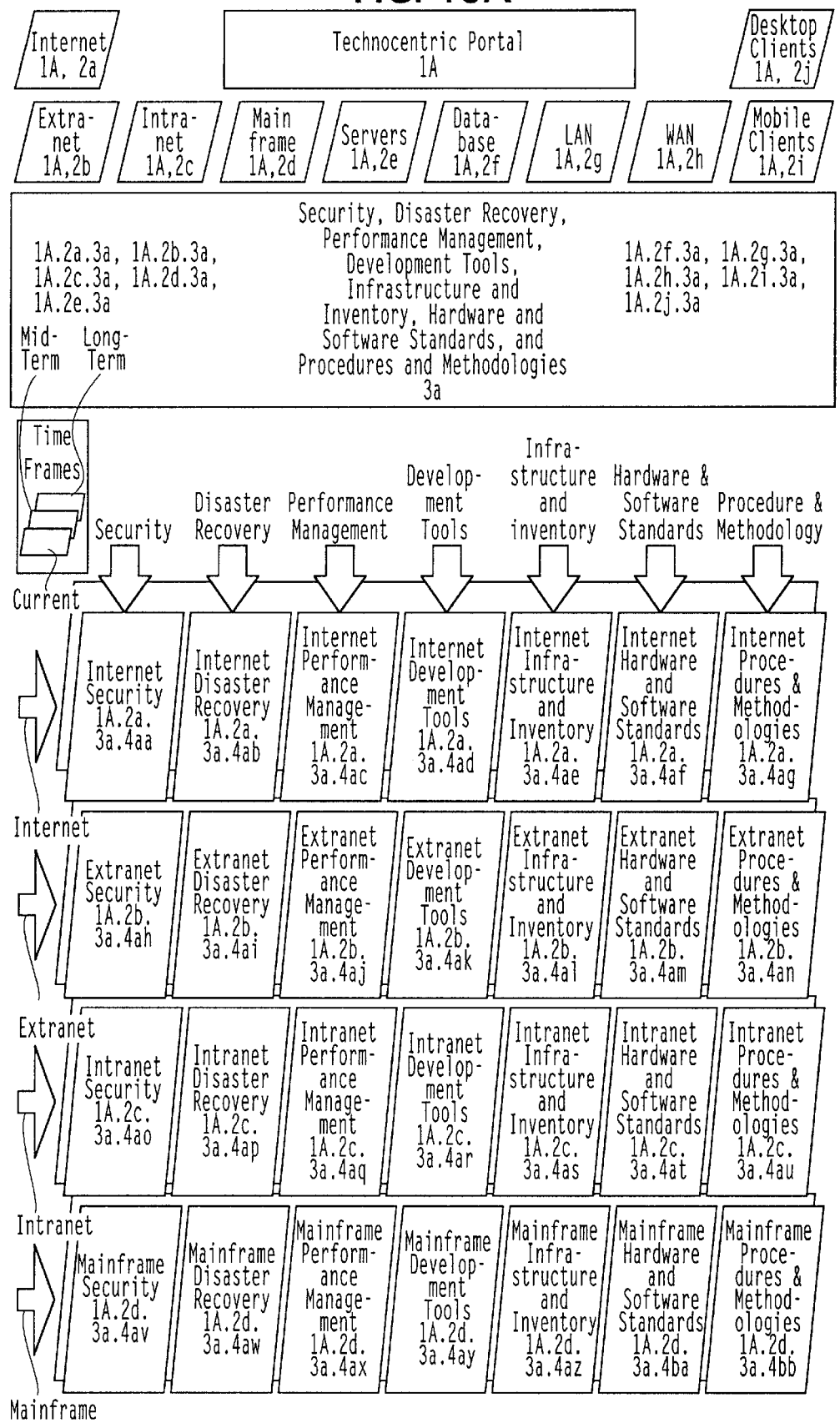

DEVELOPMENT PORTAL

THE SAME CONTENT IS AVAILABLE TO USERS IN DIFFERENT ROLES, WHO MAY ARRIVE AT IT BY DIFFERENT ROUTES.

SYSTEM FOR PRESENTING AND MANAGING ENTERPRISE ARCHITECTURES

CROSS REFERENCE TO RELATED APPLICATION

This application is related to U.S. application entitled CONTENT MANAGEMENT SYSTEM having Ser. No. 09/222,831 by Baxter and Vogt, filed Dec. 30, 1998, now U.S. Pat. No. 6,356,903 and incorporated by reference herein.

BACKGROUND OF THE INVENTION

1. Field of the Invention

The present invention is directed to a system that manages enterprise technical architectures and presents multiple views of the architecture to users and, more particularly, to a system that allows different users within an organization to view the architecture in a customized fashion that takes into consideration the content type, time frame and level of detail requirements, and common needs of that particular user.

2. Description of the Related Art

An enterprise architecture comprises all the structural, procedural, computing, communications and technical information about an organization and its systems, operations, and facilities. The term architecture applies to both the process and the outcome of developing, determining, and specifying the overall structure, logical components, and the logical interrelationships of an organization's computing environment, its operating system, its network, or other conception. The architecture can include: written documents, including descriptions of the configuration as well as plans that indicate how the configuration is to change in the future; drawings such as equipment layouts; financial documents such as cost spread sheets that can be interactive; methodologies and procedures; standards; systems; projects; research areas; etc.

Typical technical architectures are static documents that lay out a series of graphics, tables, and text in a traditional text document (or in an on-line form that simply re-purposes text-based material from a printed form). Information is stored in large blocks (such as documents, sections, etc.), that contain a multitude of ideas. These documents present the architecture in a serial/linear fashion, and importantly, in only one way, or paradigm.

What is needed is a system that will allow each user to obtain a view into the enterprise architecture that is customized or customizable to the user's needs. For example, an application programmer may need a very low level of detail about the management plans for a particular part of an overall software product but need a very high level of detail for the functional characteristics of the product. What is also needed is an architecture presentation and management system that can provide a level of description that ranges from a summary type level of detail that might be useful to a company executive or a very detailed description that might be useful to a technician installing equipment or a purchaser ordering such parts. What is additionally needed is a system that is dynamic as opposed to static, that is always current and evolving rather than quickly dated, and one which can be used both as a reference and as an input to business and strategic planning.

SUMMARY OF THE INVENTION

It is an object of the present invention to provide users customized views into a dynamic technical architecture.

It is also an object of the present invention to provide view portals that focus the view according to predetermined needs.

It is an additional object of the present invention to provide a system that builds the pages users see dynamically, assembling all relevant information components on the fly based on the user's request.

It is another object of the present invention to provide views that vary according to the dimensions of level of detail and time frame desired.

It is also an object of the present invention to divide information into "atomic" units which are stored and accessed separately.

It is an object of the present invention to access the atomic units in different combinations based on the view the user requests.

It is an additional object of the present invention to provide views of the information according to the role of the user in an organization.

It is a further object of the present invention to present the information according to the time and detail dimensions in customized views.

It is an object of the invention to automate the maintenance of the content.

It is still another object of the present invention to provide architecture information to drive business and strategic planning decisions.

It is also an object of the present invention to separate content from any specific or limited use or presentation, to enable content component reuse and repurposing.

It is also an object of the present invention to allow the sharing of enterprise information with minimal redundancy.

The above objects can be attained by a system that manages and presents enterprise architectures targeted to the needs of the user by allowing different users within an organization to view a technical enterprise architecture in a customized fashion taking into account the content type interest, level of detail and time frame of the information desired. The system includes a browser interface that allows the user to select a portal specifying the type of content the user desires to view. The user has an associated profile which indicates the preferred level of detail and preferred time frame of information to be obtained. The interface provides the users selection of desired information within the portal in the form of a page request that includes the type, detail and time frame attributes. The page request is sent to a web server. The web server relays the page request to an object server that queries a database using the attributes to obtain content satisfying the request. The content is formed into a web page and provided back to the interface by the web server. The content is separated into atomic units allowing the information to be rearranged as requested by the user. The content is updated based on update notifications sent by a mail server to owners of the content where the notifications are responsive to expirations detected by the database server.

These together with other objects and advantages which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

FIG. 11 depicts some of the information contained within a technocentric portal.

FIG. 12 depicts pop-up menus facilitating navigation of the technocentric portal.

DESCRIPTION OF THE PREFERRED EMBODIMENTS

Figure 1:
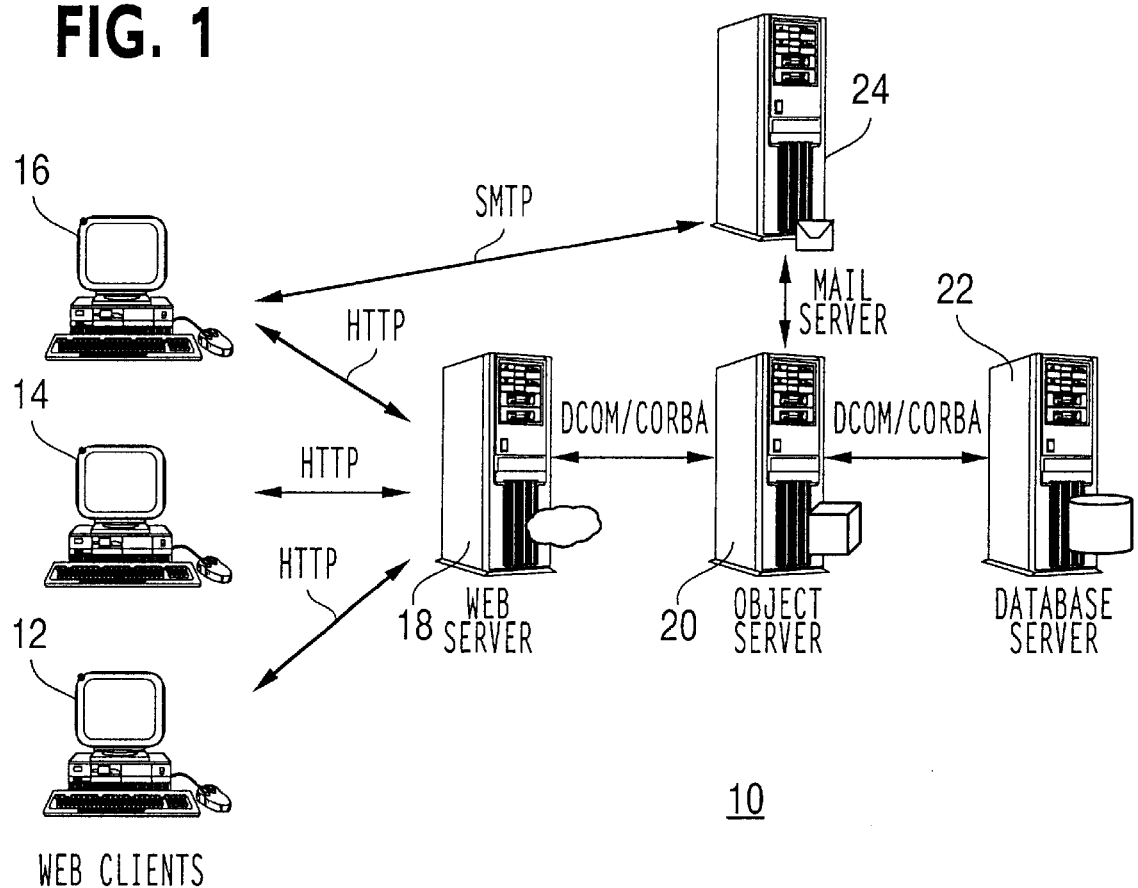
FIG. 1 depicts the hardware components of the invention.

The present invention, which for convenience will be called an Enterprise Architecture Manager (EAM), is a dynamic, web-based system, built on a foundation of extensible markup language (XML) and an SQL server database. The technical architecture identifies the categories and interactions between categories that underlie the business and strategic operations of an organization. These general categories preferably are:

management functions selected technology segments systems and projects procedures and methodologies hardware and software standards infrastructure description and inventory Each component is represented with varying levels of detail and multiple time frames allowing the view of the architecture to be customized based on user preferences. This allows the invention to function as both a technical and managerial reference. The invention can be used as a strategic planning tool, a project planning tool and a day-to-day decision support system. The categories can be defined with more specificity such as:

| Tabs | Infrastructure Description & Inventory | Hardware & Software Standards | Procedures & Methodologies | System Types & Projects | Selected Technology Segments | Management & Planning |
|---|---|---|---|---|---|---|
| Time Dimensions for Each Tab | Current, Mid, Long-Term | Current, Mid, Long-Term | Current, Mid, Long-Term | Current, Mid, Long-Term | Current | Current, Mid, Long-Term |
| Categories Within Each Tab | Servers | Servers | Servers | DSS | XML | Organizational Development & Change Management |
| | Disaster Recovery | Disaster Recovery | Disaster Recovery | Workflow | Voice Over IP | Budgeting |
| | LAN/WAN Clients | LAN/WAN Clients | LAN/WAN Clients | Net Transactional Systems | Desktop Video Conf. OLAP | Strategic Direction Business Drivers |
| | Net Database Mainframe Security | Net Database Mainframe Security | Net Database Mainframe Security | EDI Imaging R&D Knowledge Management | Data Mining Biometrics Intelligent Agents Enterprise Objects | |
| | Voice & Video Network | Performance Mgmt | Performance Mgmt | Re-usable Objects Training | Integrated copier/fax/printer Remote Access Smart Cards | |
| | | E-mail Development Tools (includes info from categories above) | Planning Research New Technologies | | | |
| | | | (SDLC) Purchasing Help Desk GUI Development Standards | | Wireless Network Electronic Banking Internet Based EDI ATM | |
| | | | | | Bar Coding | |

The EAM allows different users within an organization to view the technical architecture in a customized fashion that takes into consideration the interests, level-of-detail requirements, and common needs of that particular user. There are several important elements to the EAM, including:

Separating and storing the architectural content (i.e., the information) as "atomic" units of information that can be rearranged and presented in customized ways. An "atomic" unit is a unitary object (in this case, a piece of content) that is essentially indivisible, unchangeable, whole, and irreducible for the purposes of its use within the system.

This generally means one idea, and one which should stand alone. It may incorporate both text and graphics (because separating a picture from text that describes it may mean that neither can properly stand alone). Broadly speaking, an atomic unit will only cover one subject, but that subject may have relevance to any number of topics or categories further up in the hierarchy. Again speaking generally, atomic units do not refer to anything further down the tree, with the clarification that content components will contain sub-components, such as list items, links, references, and keywords. As an example, an atomic unit might exist in the system for a security feature such as a firewall. The content in this unit would likely describe the function of the firewall (to serve as a secure gateway to prevent unauthorized access to the network), perhaps provide a diagram of its configuration, and mention the components of the firewall system, i.e. gateway server, router, software filtering or screening programs, proxy server, etc. This atomic unit would be included in various topics in the technical architecture, such as Internet access, Intranet, Extranet, and any overall security category. There would likely not be a further unit of content on filtering software, for example, because mentioning such programs outside the context of the firewall structure in which they are used would not allow them to stand alone meaningfully.

Categorizing and contextualizing information along "dimensions", including the dimensions of time and level-of detail, to enable the users to understand the architecture from different angles.

Making the system easier to use by providing views customized to the user' major roles and perspectives. Presenting the information in a way that integrates the concepts of organizing information by dimensions and customized views.

Providing a navigational "toolbox" to simplify use of the EAM.

Automating maintenance of the EAM through an automated messaging capability.

The EAM achieves each of these features through mechanisms which are tools or design characteristics of the system. The following sections provide descriptions of these features, as well as examples of the mechanisms used to achieve them. By combining the capabilities afforded by a multitude of technologies, including XML, HTML, DHTML, CSS, and SQL Server, and the mechanisms described in the following sections, the EAM presents a technical architecture in a way that is new and very useful to interested parties within an organization.

The EAM enables an architecture to be displayed in numerous ways, using several different metaphors and models, depending on the needs of the viewer. This is possible by virtue of the highly granular, context-sensitive content storage model that allows for on-the-fly groupings of information and display of that information in the very fluid medium of the Web. Through this approach, the EAM maximizes the customization of information that is presented to the user—no unnecessary information has to be present.

The EAM stores the units of information in a relational database, such as a conventional SQL Server. The database stores attributes (i.e., characteristics) about each unit of information. The attributes provide a mechanism for sorting, filtering, and categorizing the units in many different ways. The units of information may be assembled in many ways to satisfy the interests of the user. The use of these attributes, which take the form of XML tags and keywords, enables the EAM to simplify the process of finding and assembling the right information for each user.

The database storing these units of information is structured to address the specific needs of a technical architecture. The database stores the types of components that are brought together to create a technical architecture, such as "Content," "Outline," and "Document." As stated above, it also stores attributes that describe each of these entities.

The XML data type definition (DTD) set forth in the Appendix included herein provides a framework for online presentation of the information stored in the database. It creates a set of definitions and structures for the information stored in the database, so that it can be interpreted and viewed through a conventional web browser, such as Netscape Navigator™.

The EAM uses XML to assemble the units of information about the technical architecture into meaningful documents. XML markup includes the attributes describing the units of information in the database. Applications processing the XML data can then present a subset of those units by matching the attributes with the need expressed by the user. For example, if the user indicates that he wants more detail about a certain topic, XML enables the logical assembly of the more detailed set of information. XML also contains the information used by cascading style sheets or other formatting templates for on-screen presentation, printing or other presentation media.

The EAM organizes and classifies the units of information along several dimensions to enable greater customization. These dimensions provide a way to distinguish units of information in important ways, such as by content type, time and level of detail. The dimensions help to add context to the information that is presented. Each dimension contains a range of points—for example, the level-of-detail dimension will contain high-level, mid-level, and low-level as points while the content type dimension can include management, development and technical as points. Every unit of information stored in the EAM is described by a point for every dimension, thus providing a mechanism of organizing the units of information.

The EAM uses both database design characteristics and XML to organize information according to a minimum of two dimensions tagged as attributes where many more than two dimensions are possible. For each dimension, the database contains a column that stores a value assigned to the units of information. For example, if a dimension is "time," then each unit of information has a value (e.g., current-present, tactical-mid-term, strategic-long-term) stored in the database that describes it based on the attribute, time. As the user requests current, tactical, or strategic information, XML enables assembly of information that is specific to that time frame. As the user requests a change along a particular dimension (e.g., more detail, different time frame, etc.), XML enables assembly of a new set of information in response, that corresponds to the particular point of interest along that dimension. In particular, XML allows assembly of a new view of the same type of content (such as more detailed or different time frame) by re-navigating the XML object tree, without requiring a new request to query the database. Users can request information by specifying points along multiple dimensions—for example, a user can request current, highly-detailed information about the company's mainframe environment.

The EAM enables users to understand the technical architecture by viewing it from multiple perspectives or content type desired. These views are optimized to the needs of the major roles and perspectives of the users. They serve as entryways for the users. They also provide initial direction for the user, to help him find the information he needs. Each view presents only a limited set of topics for the user to choose from, to reduce the complexity of the system. If, however, the user wants to access information that is not represented by a topic in the view, he or she will still be able to do so. The views do not restrict the set of information that is accessible to the user. Rather, they present topics that are most likely of interest.

The EAM provides custom views that follow the paradigm of "portals." The EAM has portals that address major roles and perspectives that are relevant to a technical architecture. These roles include development, management and planning, and technical support. A major perspective includes the federal enterprise architecture (FEA) model, which describes the basic units of a federal agency's technical architecture.

As has been stated, the EAM categorizes information along dimensions. It has customized portals that provide users with a focused set of information. These concepts simplify and improve the presentation of the information. As described below, the usability of the EAM is enhanced through applying the concepts of dimensions and portals.

The concept of views customized for roles and perspectives contributes to the overall usability of the EAM during the initial stages of a user's session in the EAM. By customizing portals to the user' major roles or perspectives, the EAM provides distinct entryways into the technical architecture, and guides the user through the first several layers of information. This guidance includes the distillation of many types of complex information into smaller subsets. These subsets of the site are attuned to the most common needs of the user of a portal, allowing quick access to the most relevant information. Other information is available but requires more navigation by the user.

The concept of information organization by dimensions contributes to the overall usability of the EAM as the user dives deeper into the technical architecture and refines his or her own information needs. For example, dimensions allow the user who is browsing information to go into greater or lesser detail and search across various time frames. As a result, the EAM places much lower demands on the user's ability to forecast what information he or she really wants. These mechanisms enable the user to quickly and easily arrive at the information of interest, even if he or she starts off by looking in the wrong place.

In addition to storing architecture information, the relational database also allows the EAM to store custom viewing preferences and configurations for each user of the architecture. Based on these preferences, the EAM uses technologies (including HTML, Dynamic HTML, and Cascading style sheets) to create a dynamic environment on the user's screen that is highly customized for each individual. These mechanisms provide global improvements in usability and customization.

As has been stated, the EAM provides customized views of the technical architecture. To provide easy browsing and viewing functionality, the EAM includes a navigational "toolbox" that serves as the user's one-stop point of entering commands.

The navigational toolbox is a control center for functions accessible from all EAM pages, which can be implemented as a drop-down menu, a toolbar, or even a group of buttons scattered across the screen. The toolbox contains associated programming logic enabling the user do the following things with just one click or keystroke (or any other means of executing a command):

Request and view information that is related to a particular point along the time, level of detail, or other dimension.

Request and view information that is related to a different section of content (e.g., jumping to software-related information when browsing hardware information).

Set a viewing preference specifying whether the user wants to view information that spans across the technical architecture, or that dives into great detail about a particular topic.

Immediately jump to any one of the portals.

Execute miscellaneous functions, such as retrieve the point of contact for a given piece of information, browse a site tutorial, access a technical architecture index, or perform a search.

Existing browsers, such as Netscape Navigator™ and Microsoft Internet Explorer™, currently contain some of the functions listed here, like "Search." However, the search function in the EAM toolbox provides context-specific search capabilities—looking only at technical architecture-related information.

Browsers also contain navigational tools, such as "Back," and "Forward." These two commands, however, operate differently from the toolbox's functionality. Existing browsers store a list of recently visited web sites, and if a user wants to go back to one of them, the browser goes to that site. These commands only allow progression and regression along the series of web pages recently browsed by the user.

In contrast, the EAM toolbox provides functionality that is fundamentally different from and better than this basic serial navigation. The EAM toolbox enables the user to view a dynamic set of information, assembled by XML, based on the commands entered through the toolbox. The user need not have "visited" a certain set of information to browse to it using the navigational functions. This is distinct from the capability of an existing browser, in which a user could visit a web site and choose the "Back" option to return to it. The functions in the EAM toolbox dynamically call particular sets of information to be viewed, based on what command is entered.

Each button in the toolbox is associated with a command script that performs the relevant function when the user clicks the button to activate the script. For functions that involve changing the view of information displayed, such as for a different time frame or level of detail, a script instructs the object server to re-navigate the XML object tree to deliver the content that matches the view or preferences that the user requested. The options available in the toolbox for a user to "jump" to a different, related section of content are driven in part by the content the user is viewing. For example, when the system generates a page in response to a user request, the content on that page includes (in XML attributes) other sections that also make use of that content. This offers the user an always-current list of context-sensitive cross-references available for direct navigation with the toolbox.

The EAM introduces to the venue of a technical architecture, automation of the maintenance process. System maintainability is of utmost importance—if the authors of units of information (who are the "owners") do not find their sections easy to update, then the sections will not be reliably updated and the site will quickly grow out of date. If the site grows out-of-date, users will not use the site.

Automated maintenance helps the EAM take major strides towards maintaining updated information about the technical architecture. Usually, it is very difficult to update a large body of information, like a technical architecture. By automating this process, the EAM transforms the updating process from one monstrous, daunting project into small, manageable tasks that each owner can easily perform.

To provide automated maintenance, the EAM is designed with certain capabilities. Every unit of information in the EAM has an owner and an expiration date. When a unit of information reaches its expiration date, the date triggers a process to request an update. An automated, electronic notification program on the EAM server sends a message to the information owner through a system such as e-mail. The owner receives the message, which contains a vehicle, such as a form, that allows the owner to update the section for which he or she is responsible. The owner must gather updated information—either through research or through discussions with involved parties. The information may contain text, images, or both. When the owner has collected updated information, he or she enters the modified information (either text or a pointer to an image) into the update vehicle which is then returned to the database server. The server program analyzes the composition of the new section. This analysis determines whether or not the new text can be stored in the exact same structure as the old text. If the old and new sections are sufficiently similar, the information will simply be updated in the database.

If the old and new sections differ so that the new information cannot simply overwrite the old information in the database, the form is then routed to a human supervisor trained to understand the underlying data. This supervisor then places the updated section information in the database in such a way that it works in harmony with the existing content. The updated content is then immediately available to online architecture users.

The present invention is preferably implemented using a hardware configuration 10 as depicted in FIG. 1. The typical operation involves a user at one of several client machines 12, 14 and 16, such as a desk top computer, making a request for a page of information in substantially the same way that requests are made over the web using a conventional browser. The request is provided to a web server 18 which requests the needed information from an object server 20. The object server 20 obtains the information from a database server 22 and returns it to the user through the object server 20 and web server 18 where it is displayed to the user. The user can then link to other pages through the displayed page until the desired information is obtained. A mail server 24 is provided to communicate with the author of the information in the database when the expiration date of the information is reached, allowing the author to update the information if desired or reset the expiration date. The processes discussed herein are typically stored in a storage medium such as a disc.

Figure 2:
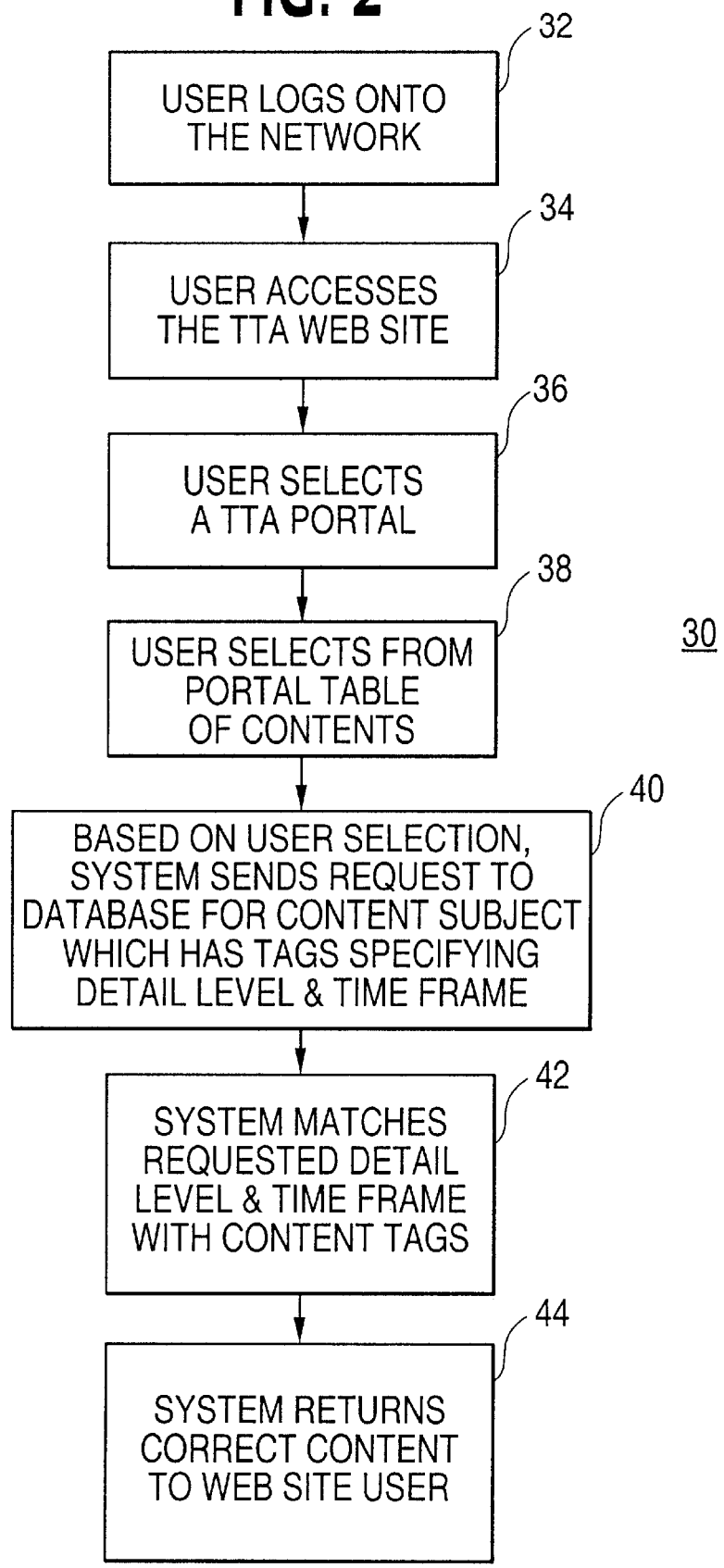
FIG. 2 shows process of entering using the invention through a portal.

The typical interaction 30 in the system, as depicted in FIG. 2, starts with the user requesting a web page, such as when a web user requests connection to a particular site and receives the site home page then logs 32 onto the network thereby accessing 34 the EAM web site. This EAM site home page is like a typical web page which includes underlying or hidden links to other pages. The user would select 36 a desired portal, the types of which will be discussed in more detail herein. At this point, the user can select other alternatives such as changing the default time frame or the default detail level using selection tools which will be discussed later herein. For example, a manager would access the system EAM "home" page for a particular project by entering the project home page into the browser or choosing a book mark. From this project home page the manager could select a management and planning "portal" or page which would be downloaded to the browser. The selection of the portal can be used to specify the level of detail desired by the user by using the selection to access a portal chart. For example, a chart such as:

| Detail Level | Portal | | |
|---|---|---|---|
| | Development | Technocentric | Management |
| Low | Technology Planners | Chief Information Officer | Technology or Business Line Vice President |
| Medium | Application Development Project Manager | Budget Analyst | Business/Technical Application Liaison |
| High | Application Programmer | Local Area Network Technician | RFP Author |

This chart provides levels of detail and portal (content type) for representative users of the EAM web site. The above chart is based on roles within the organization and represents the kind of information used by the database to determine which search tags (and therefore, which content) should be returned to the web site user. From the management and planning portal the manager selects 38 an item for example, "emerging technologies planning" from the portal "table of contents." Based on the user selection, the system requests 40 content with the desired view (management and planning), level of detail and time frame attributes. The time frame for the portal preferably has a default that varies depending on the portal through which the user entered (and which can be changed using the toolbox or other links). For the management and planning portal, the time frame is preferably "strategic." Any user can change the time frame for information they see through any of the portals; and preferences specific to a user (in contrast to a portal) are set and stored in a user preference table in the database. The match for the attributes is found 42 and the content is returned 44 to the user. The user can then link to other items of information by using a similar browser selection process.

Figure 3:
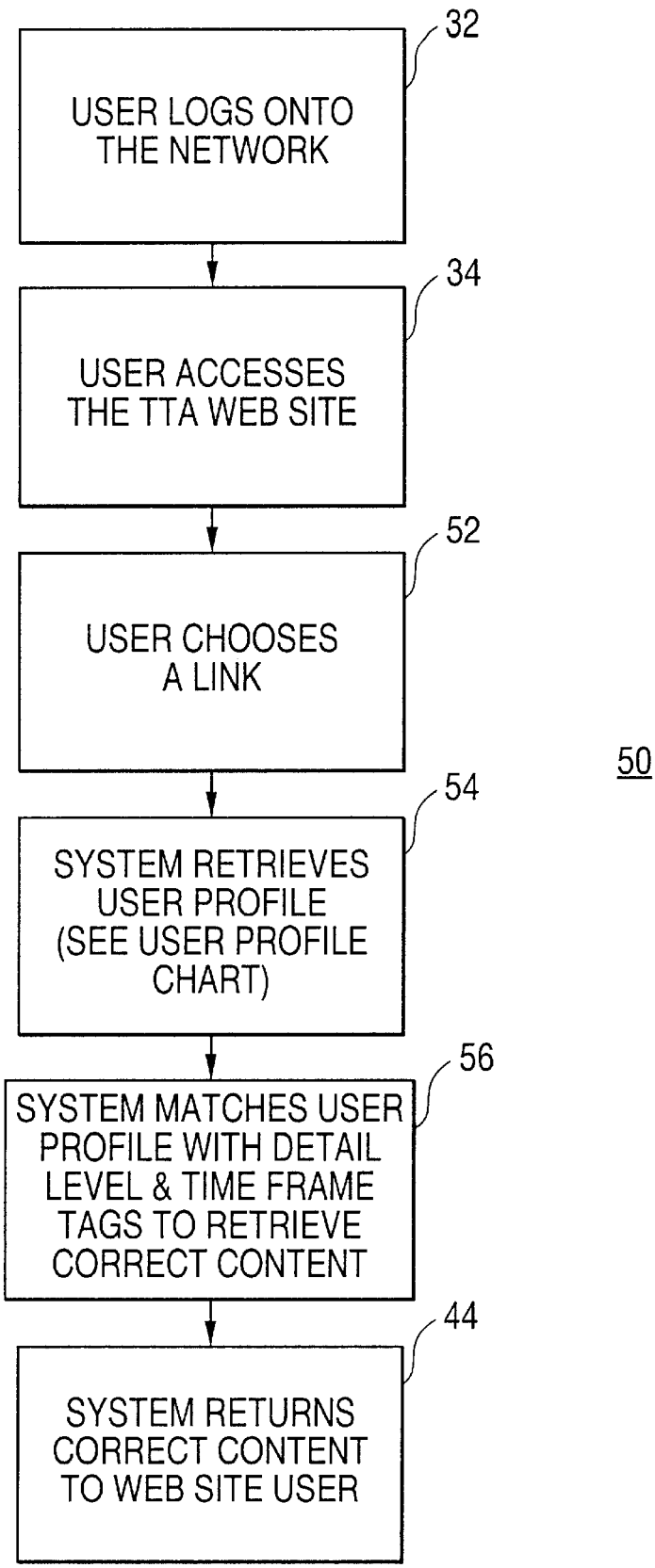
FIG. 3 depicts accessing the system using a user profile.

As an alternative or in conjunction with the process of FIG. 2, the process 50 of FIG. 3 could be performed. In this process, the first few operations 32–34 are the same as in FIG. 2. Once the EAM site is accessed, the user can select a piece of information for which they wish to know more or choose a link 52. In choosing a link, the user positions his or her mouse pointer on an active link as viewed through the browser interface and clicks the left button on the mouse to select the link. This action invokes the familiar conventional hyperlink behavior customary on the web, where clicking on a link either: (1) loads a new page corresponding to the link destination, or (2) activates a procedure through a script command assigned to the event handler for the "onClick" event. The system then retrieves 54 a user profile chart that defines the level of detail, and time frame initially to be used for access into the EAM via this link for this user. A chart such set forth below could be used.

|  | Time Frame | | |
| --- | --- | --- | --- |
| Detail Level | Long-term | Mid-term | Current |
| Low | CIO | Technology Planning Manager | Director of Operations |
| Medium | Budget Analyst | Change Management Planner | Project Manager |
| High | RFP Writer | Technology Planning Analyst | Application Programmer |

This chart provides levels of detail and time frame for representative users of the EAM web site. This chart is also based on the user's role within the organization and represents the kind of information used by the database to determine which tags (and therefore, which content) should be returned to the web site user.

Additional search tags that can be specified automatically or via a selection process by the user can include: person responsible for supporting the content of the piece of the architecture, architectural resource interdependencies, usage level of the web site content, content subject volatility of the architectural resources, geographical region, level of maturity, age of technology, the date content last changed, content author and content source, among others. The system then uses the profile to perform a match type search 56 of the content of the architecture to retrieve the desired content for the user. This information is then returned 44 to the user.

Figure 4:
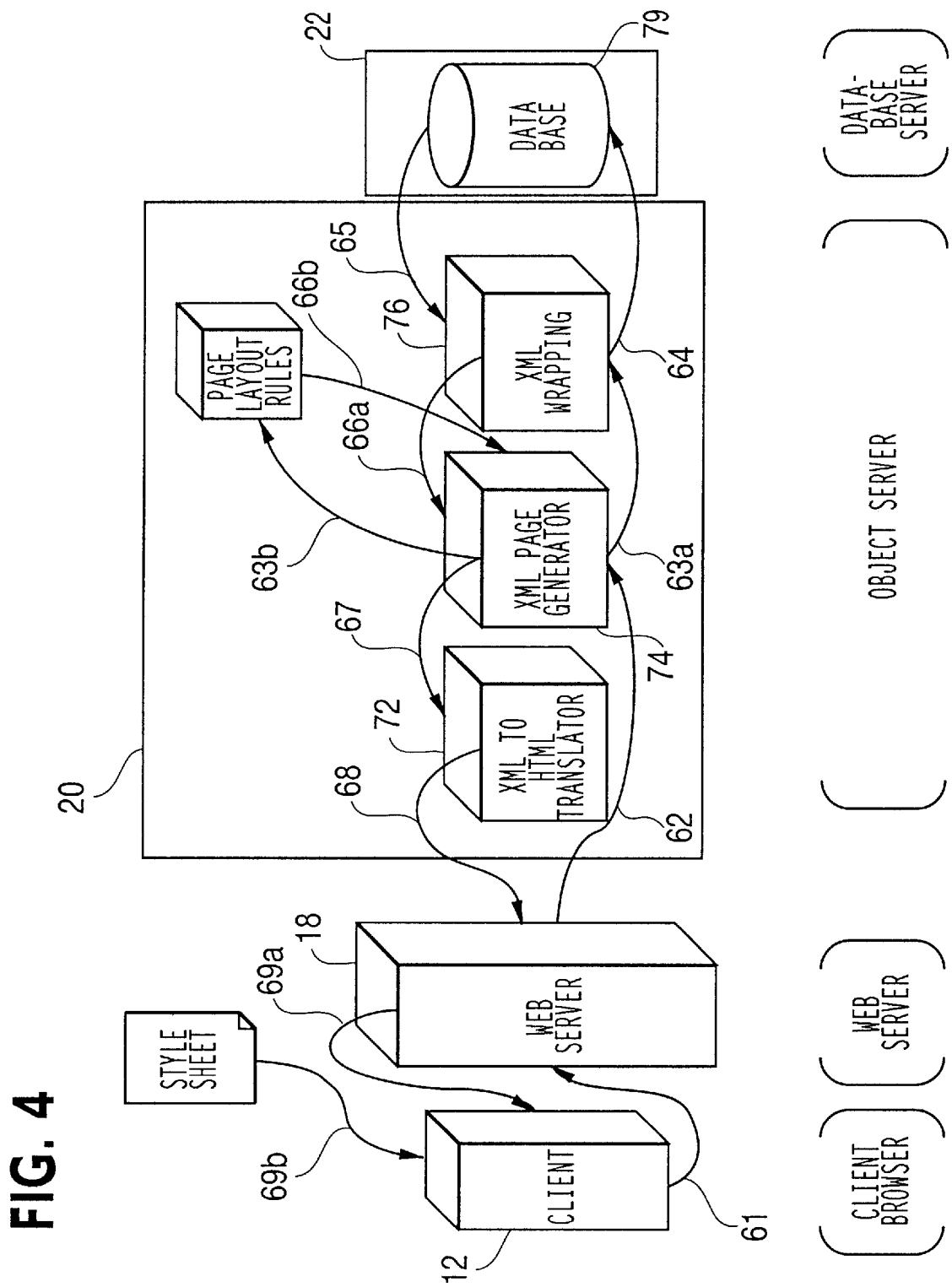
FIG. 4 shows the processes performed in providing information to a user.

The operations performed by the various system components of FIGS. 2 and 3 in retrieving the desired content are depicted by the process flow 60 in FIG. 4. In a first step a client sends 61 a request for a page by passing the page name and ID to the web server 18. A "page request" actually calls an outline for a specific page, rather than an existing complete page. The outline lists the various sections and content that will be assembled by the system to generate the page, as well as the style sheet that will be integrated with the final page to control the way it is rendered. This structural outline ("parent") is expressed in XML, as are all of the "children" components that go with it; XML data is represented as a hierarchical tree, so the system can navigate the tree to retrieve the components it needs to build the page. The web server 18 relays 62 the page request to an XML page generator process 72 within the object server 20 via a protocol such as DCOM or CORBA. The operations of the generator are discussed in more detail in FIG. 5. In general, the generator 72 compares the user's request (time dimension, level of detail, etc.) to the attributes stored in the XML tags that mark the tree's components, and only returns the information contained within tags whose attributes match the desired dimensions. The generator accomplishes this by using one or more queries to state the equivalent of "I'm looking just for information within this outline structure that has attributes that match what the user just asked for." Obtaining the right attributes from the user can be accomplished in a number of different ways. The system, in one approach, can reference a user table (and therefore query to match both user information and content from the database). In another approach, the system can obtain specific preferences from a user's selection in the client (browser) interface, i.e. a link or the toolbox, which will be passed to the object server as parameters to the commands initiated with the script invoked by a user's selection. During this operation, the XML page generator 74 sends out queries requesting information it needs to produce the page. This is accomplished by the page generator 74 sending 63*a* a request to an XML wrapping process 76 for an XML tree containing the content for the desired page. The page generator 74 also requests 63*b* special rules from a rules file or database 78 needed to construct the page from the page layout rules. The XML wrapping process 76 queries 64 the content database 79 of the database server 22 for the page content and structure. The database 79 returns 65 the page content and structure information and XML wrapping 76 creates an XML tree with this information. The XML page generator 74 receives the information it previously requested and constructs the XML page. In particular, the generator 74 receives 66*a* an XML tree with page content and structure from XML wrapping and receives 66*b* the special layout instructions from page layout rules 78. Rules such as those in a style sheet are incorporated by reference into XML or HTML pages, so they exist separate from the XML or HTML, and the system needs only to know where to find them. The completed XML page is sent 67 to a translator 72 where the XML is translated into HTML and sent 68 to the web server 18. The HTML code is then sent 69*a* to client 12 where it is merged 69*b* with an appropriate style sheet.

Figure 5:
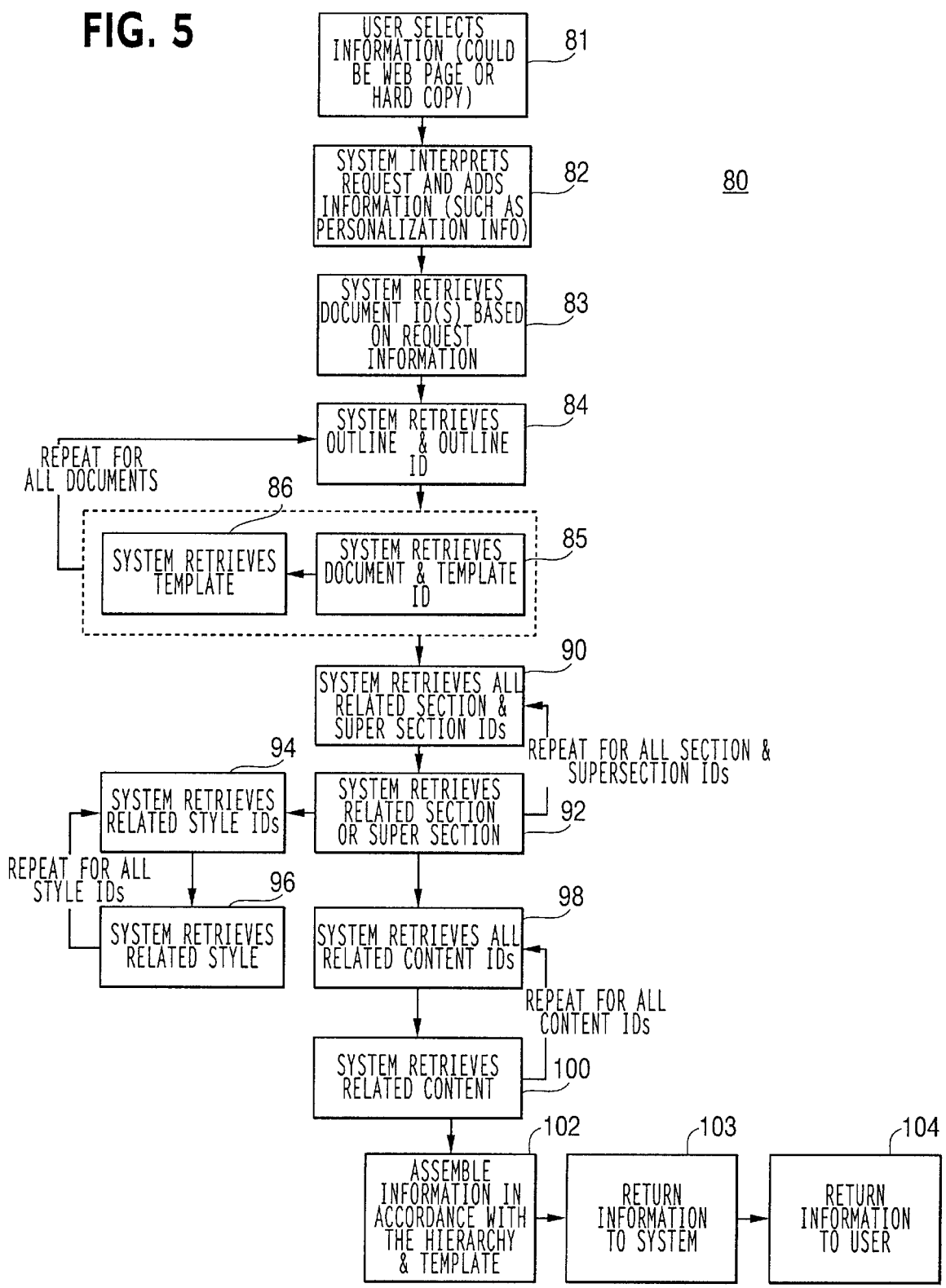
FIG. 5 illustrates the content assembly operations.

The assembly process 80, as depicted in FIG. 5, starts when a user requests 81 information contained in the EAM. The system interprets 82 the request using the profile and portal information. Document IDs are retrieved 83 based on the requested information. Next, the system retrieves document outline IDs and templates. To do this, first the document ID is retrieved and a related outline ID is identified 84. The outline corresponding to the outline ID is retrieved and a template ID is identified 85. The template corresponding to the template ID is then retrieved 86. The operations are repeated for each document ID retrieved. After all documents, outlines and templates are identified and retrieved, all referenced sections are retrieved 90 and 92, along with any super section IDs. Next, related style IDs are retrieved 94 and subsequently the referenced styles are retrieved 96. All content IDs are identified 98 from the sections and the related content is retrieved 100. After all the units of the content and documents are retrieved, the content is assembled 102 into a whole document based on the hierarchy in the relevant outlines and the dictates of the templates and styles. The assembled document is then returned to the requesting system 103, such as the web server 18 and the requesting system in turn displays 104 the assembled content to the user at the client machine 12. Additional discussion of the management of content in the EAM can be found in the related application previously mentioned.

Figure 6:
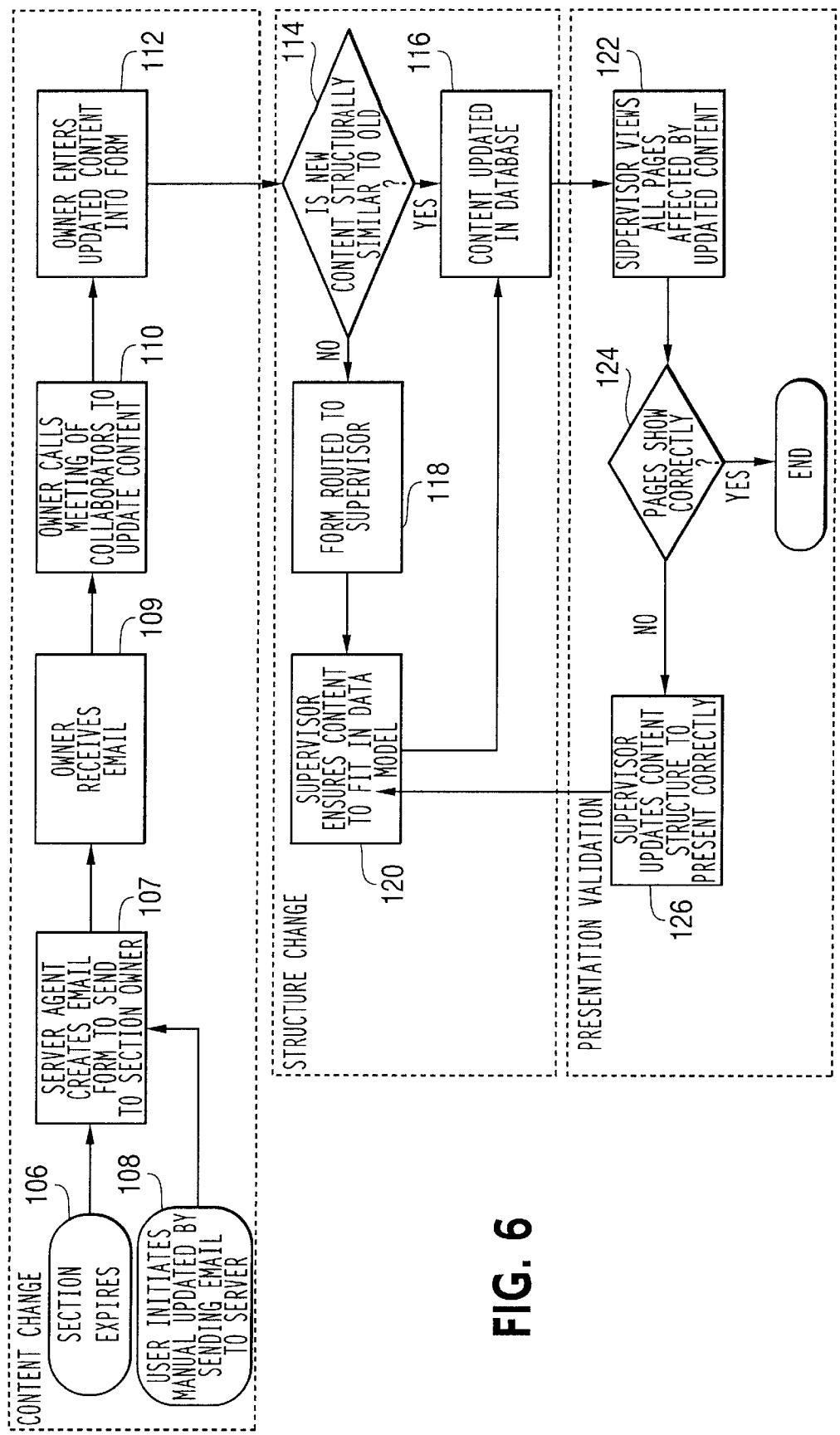
FIG. 6 shows the process of updating site content.

The workflow for maintaining the content of the web site is described with respect to the process 105 of FIG. 6. While navigation is extremely important to a site like the EAM, maintainability is of equal or greater importance. If section owners do not find their sections easy to update, the sections will not be reliably updated and the site will quickly grow out of date. If the site does not contain up-to-date information, users will not use the site. Preferably, every section in the EAM has an owner and an expiration date. When a section reaches 106 the expiration date, a notification agent initiates the workflow by sending 107 an e-mail reminder of the section owner. A section review may also be initiated 108 manually. Manual review of a section, a group of sections, or the entire online architecture could occur with any arbitrary frequency desired by the organization, e.g. quarterly. While individual pieces of content would change often and independently from each other (to keep everything current), and organization might well go through an annual review or similar process to check over everything, and perhaps establish a new "edition" or "version" to denote that the entire system has evolved to the next step. A preferred approach is to take items that are marked "tactical" (6–12 month time frame) and change that attribute to "current" as the time frame elapses. When the manual review is initiated, the user creates an e-mail and sends it to the server agent for distribution. The section owner (or author) receives 109 the e-mail reminder, which typically contains a form that allows the owner to update the section for which they are responsible. The owner must gather 110 updated information, either through research or through discussions with involved parties. The information may contain text or images, or both. When the owner has collected updated information, the modified information (either text or a pointer to an image) is entered 112 into the form. The electronic form is then returned to the server via e-mail. At this point, the server analyzes 114 the composition of the new section. This analysis determines whether or not the new text can be stored in the exact same structure as the old text. If the old and new sections are sufficiently similar in structure, the information is simply updated 116 in the database. If the structure of the old and new sections differ, then the form is routed 118 to a supervisor who is trained to understand the underlying data model and how content can safely be inserted into the database without violating the integrity of the data already present on the web site. The supervisor also visually inspects 122 all pages affected by the change in content to ensure that they are still presented correctly. If they are not 124, the content structure will be modified 124. The updated content is now immediately available to on-line architecture users unlike traditional paper documents.

Figure 7:
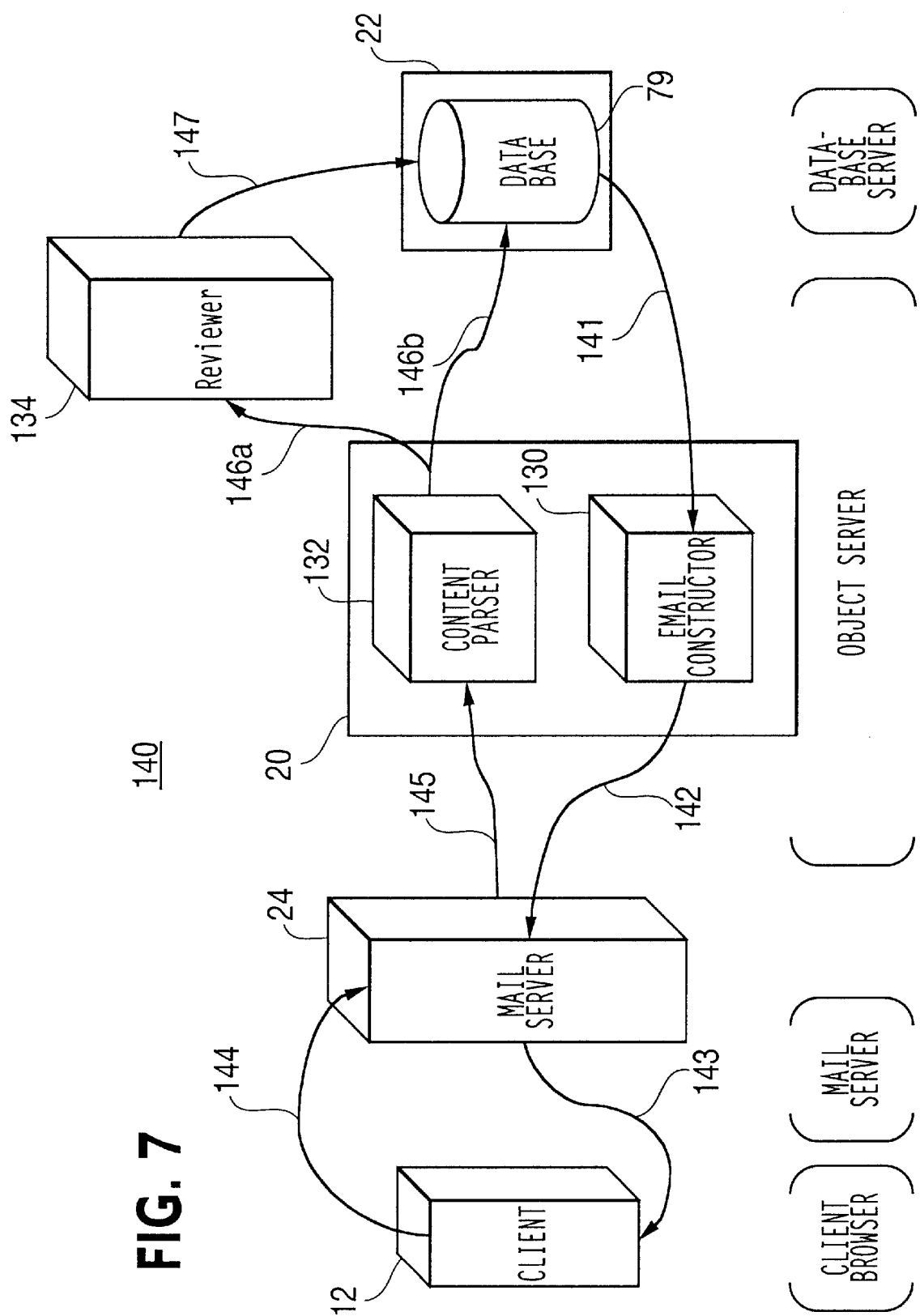
FIG. 7 shows the processes performed in updating content.

The operations performed by the various system components of FIG. 6 are depicted by the process flow 140 in FIG. 7. When a document reaches its expiration date, a trigger conventionally fires in the database 79. Expired content is sent 141 to the e-mail constructor 130 in the object server 22. The e-mail constructor 130 creates an e-mail containing the expired content and a form where updated content can be entered, uses the owner name as the e-mail address and sends the e-mail to the server 24. The mail server 24 sends 143 the reminder or update e-mail to the content owner. After updating the information, the user returns 144 the reminder or update e-mail to the system. The updated content is sent 145 to and parsed by a content parser 132 which compares the updated content to the initial content. If the contents are sufficiently similar, the updated content is entered 146b into the database 79 of the database server 22. An application such as Microsoft Word™ has a Compare Documents tool that evaluates two documents based on a number of different user-defined criteria. Sufficiently similar, preferably means that no new paragraphs or images have been added, or no other major revisions have taken place. If the contents are not similar, they are passed to a reviewer 134. The reviewer 134 is responsible for organizing the updated content in such a way that it adheres to the data model. When the reviewer 134 makes their changes, the content is updated 147 and the updated content can be entered safely into the database. Additional details concerning the triggering of content update in the EAM can be found in the related application previously discussed.

Figure 8:
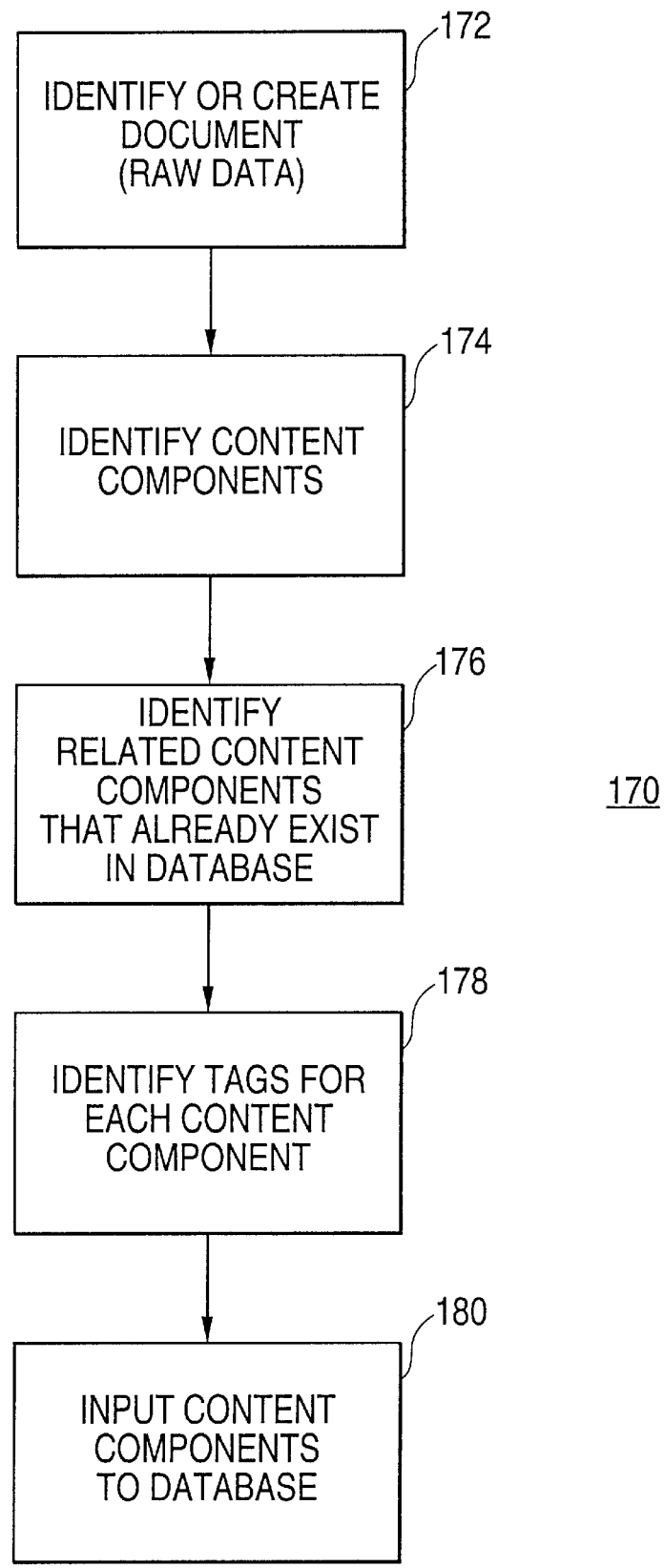
FIG. 8 depicts the process of loading the database.

In creating the EAM, a process 170, as depicted in FIG. 8, is performed. The author first identifies or creates 172 the content document (text, drawing, table, etc.). The different components ("atoms") of the content are then identified 174. Typically, determining atomicity is a human-dependent process. As previously discussed, an atomic unit has to stand alone (i.e., it has to make sense on its own, and does not reference to something else first to understand it). For example, the text associated with a single idea, even when a diagram is included, is an atomic unit. Next, the author identifies 176 related components in the database by specifying links to this related content. The authoring process can be implemented using a number of different editing tools and depending on the way in which the authoring process is implemented (i.e. what editor or tool is used), the author can provide cross references using keywords, or hyperlink addresses, or simply by reference to a content index. Every element in the database, including content units, has an ID which is unique in the entire system. A link to any element in the system requires only placing an ID reference (IDREF) attribute in the author's content that "points" to the ID of another piece of content. In specific terminology, the author adds an IDREF attribute and assigns it a value which matches any other ID in the system. The author then identifies 178 search tags for each of the components. At a minimum, the level of detail and the time frame of each component are set as tags. It is also preferred that the content type be specified by the author at this step Then the content is passed to the database 180 where the relational database system conventionally stores the content components in association with their relationships to other content.

The data or content of the database can be thought of in two different views. The first is the view in which the data is organized from a database or data structure point of view. As previously discussed, the invention preferably stores the data or content in a relational database where the relationships are structured to address the needs of the technical architecture as depicted in FIGS. 9 and 10.

Figure 9:
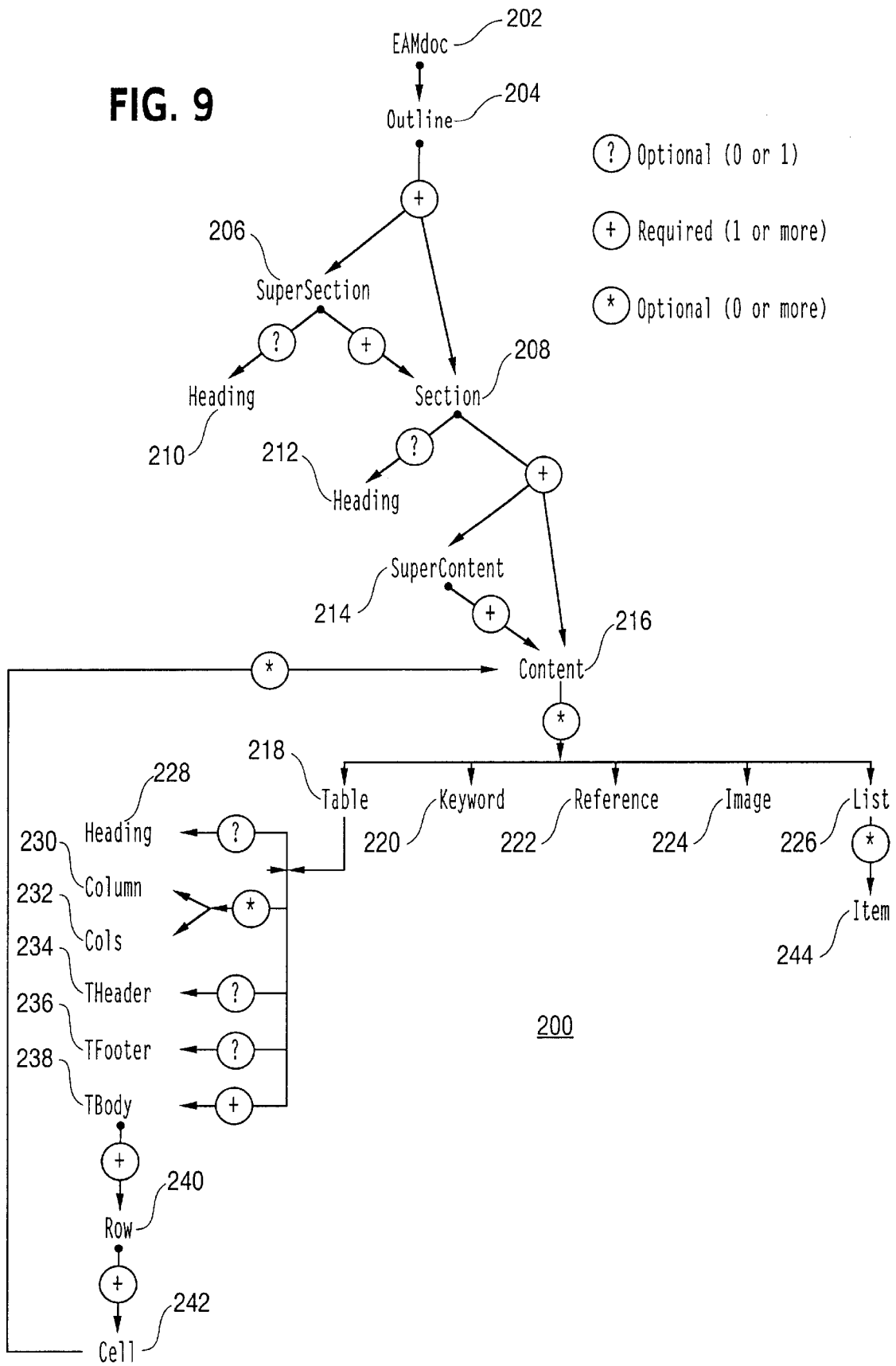
FIG. 9 shows a document type definition according to the present invention.

FIG. 9 shows the XML document type definition (DTD) or data structure that appears in the Appendix in a standard tree notation. This data structure 200, which is typically stored on a recording medium, such as a disk, has the advantage of providing a much simpler data model than those industry standard DTDs, because it includes all the content elements necessary (and only those necessary) to abstract the information associated with a technical architecture. The DTD also includes a recursive element structure (Content can have a Table that has a cell that holds Content). A single dynamic page in the EAM, named EAMdoc 202 contains a single Outline element 204. The Outline element may contain one or more SuperSection elements 206, or one or more Section elements 208; it must have at least one, i.e. the Outline element cannot be empty. A SuperSection element 206 has an optional Heading 210 (which is just character data) followed by one or more Section elements 208. A Section element 208 has an optional Heading 212 (which is just character data) followed by one or more SuperContent elements 214, or one or more Content elements 216; it must have at least one, i.e. the Section element cannot be empty. A SuperContent 214 element has one or more Content elements 216. A Content element may contain any number of Table 218, Keyword 220, Reference 222, Image 224, or List elements 226, or just character data. A Table element 218 has an optional Heading 228 (which is just character data), any number of Columns 230 or Cols 232 (column groups), an optional THeader 234 (which is just character data), an optional TFooter 236 (which is just character data), and at least one TBody 238. A TBody 238 (table body) contains at least one Row 240, and each Row contains at least one Cell 242. A Cell contains any number of Content elements. A Keyword 220 contains just character data. A Reference 222 contains just character data. An Image element 224 is empty (all its information is in attributes). A List 226 contains any number of Item elements 244, where each Item contains any number of List, Keyword, or Reference elements, or just character data.

Figure 10A:
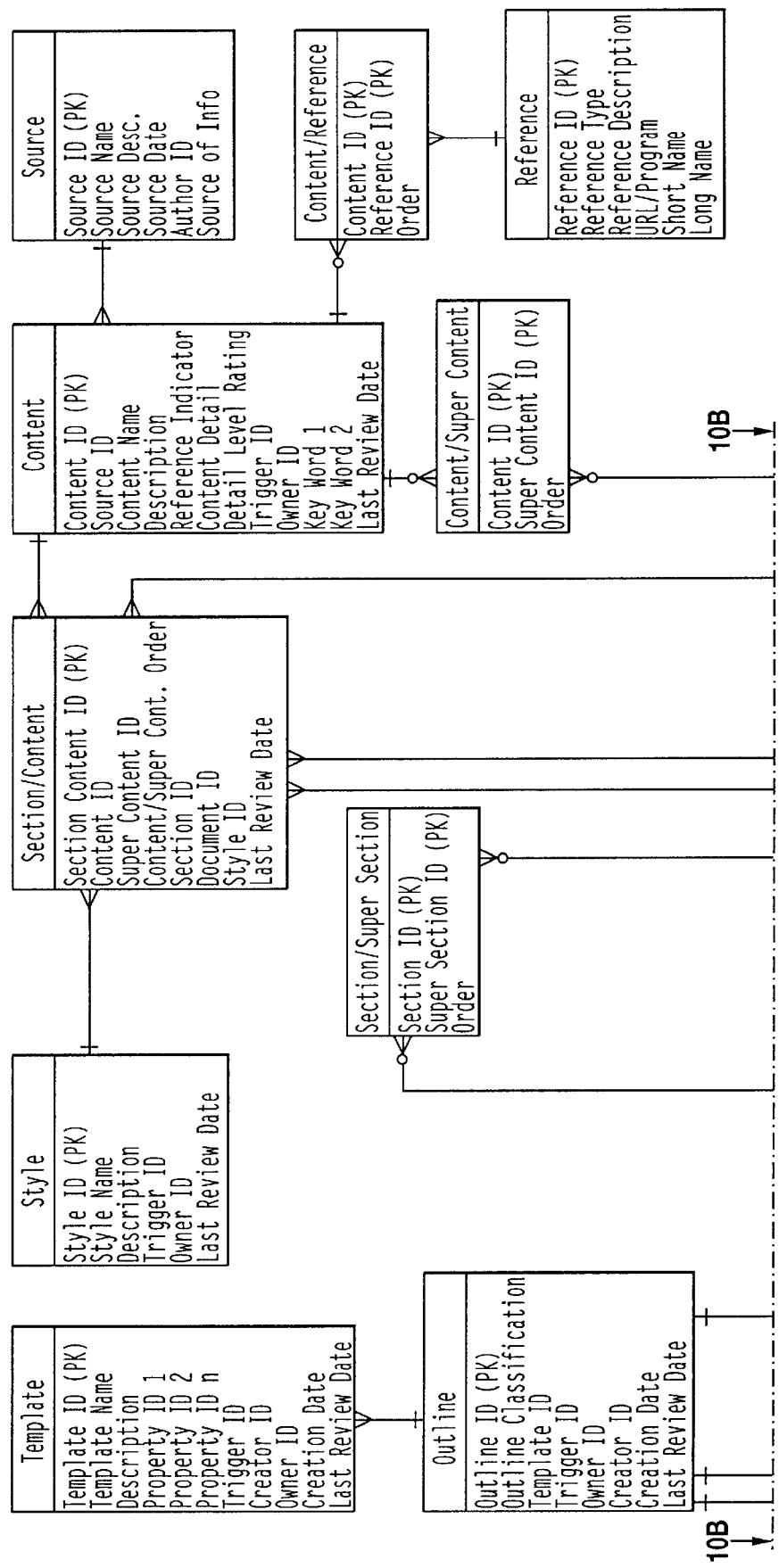
FIG. 10 illustrates the relationships within the database.
Figure 10B:
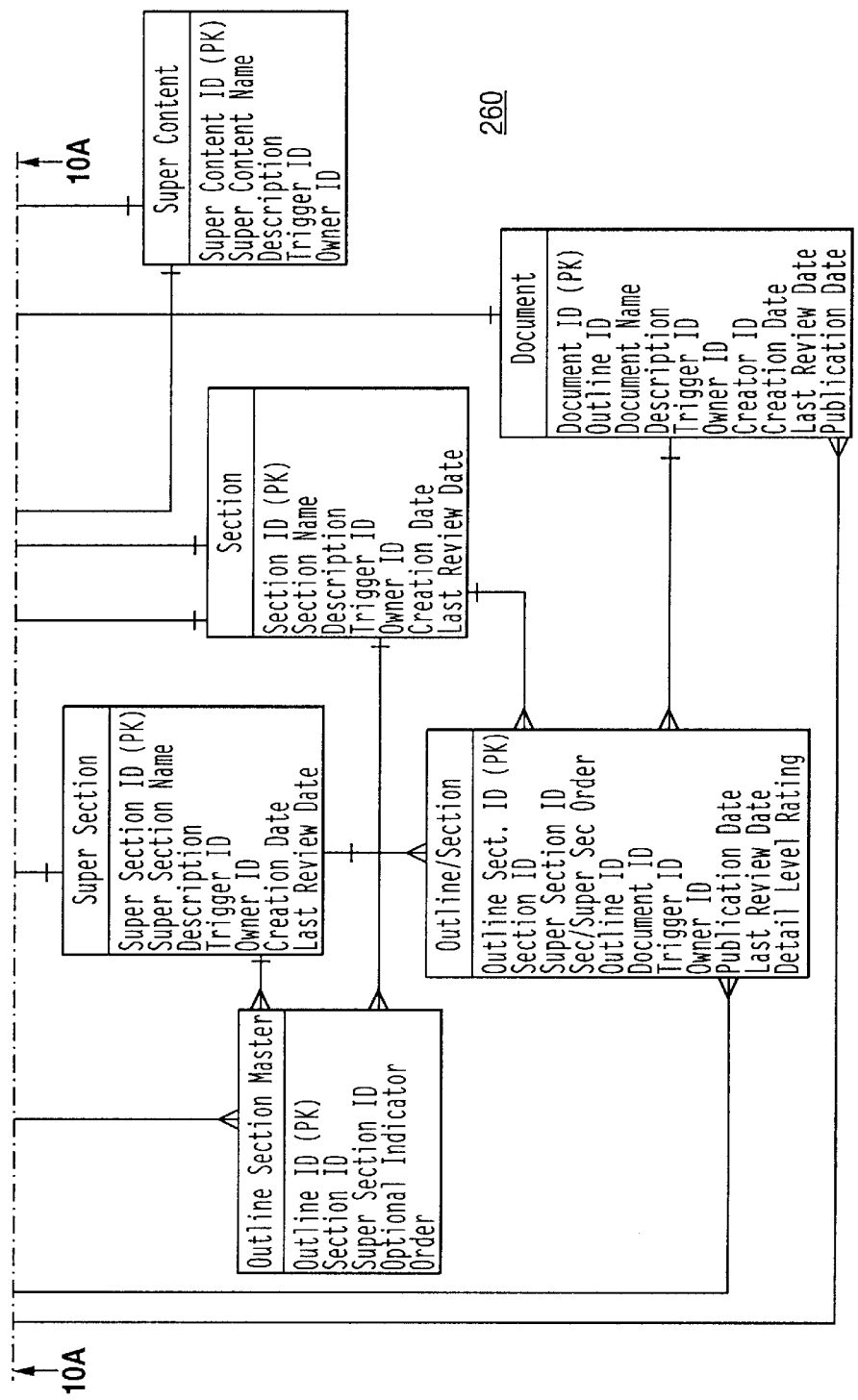

FIG. 10 shows the preferred logical data model 260 for the database when the system implements a relational database. This logical data model will be used to build the physical data model and the database structure that will be populated with the architecture content.

The second view is the view that a user has of the stored content. From the point of view of the user, the EAM organizes data in three dimensions to provide organized information to users. The architecture data is sliced by three different factors: time periods, levels of detail, and logical groupings of content components or content type. Any piece of information or content component in the database has a "value" of each of the three dimensions described and conceptually exists somewhere inside the three dimensional space. The time "value" of the data is an important part of the on-line architecture concept as typical technical architectures are often presented in paper form and become obsolete the moment they are printed. As mentioned before the EAM provides a dynamic compilation of the enterprise architecture which can be constantly in flux as the content is updated.

The EAM is designed so users can access information from three time frames. The nature of the EAM is to be very flexible and fluid as technology is continuously changing as technologies mature and new technologies arise. The time dimension is preferably split into three time frames. The first time frame is preferably current term which describes the existing or baseline architecture. The second time frame is preferably the mid-term or tactical which describes how the architecture will be in six months to one year. The final time frame is preferably the strategic or longer-term view of the architecture which describes and predicts how the architecture will work in three years. Of course, additional time frame values can be used, such as historical or visionary.

One dimension of the information content describes the level of detail of the data. The site has many different types of users and breaking the data into different levels of detail is one way of making it easier for users to access the data. The level of detail dimension is broken down into three values on sections: highly detailed, middle level of detail, and low level of detail. Each level is different and users will be presented with one of the three but can quickly go from low level to high level through the use of one of the tool box functions. The highly detailed level describes the very detailed aspects of technology and technical architecture, intended for a technologically savvy audience. The medium level detail information is not extremely detailed, but contains more than a summary and less than in depth descriptions and text intended for an audience that needs to understand the content from a summary type level as well as some of the detail. An example is a project manager. The low level of detail information is summary information briefly highlighting major points. The intended audience is managers and planners who need to know what is going on but does not get into the intricate workings or ideas of the technology or project.

A technical architecture of an organization is made up of large quantities of data. A majority of the data is extracted from the existing architecture as well as along with the emerging segments identified as target research or development segments. This information, combined with information about the organization's standards and procedures in technical development, security, performance management and other pieces that form the architecture are broken down into logical groupings which can be another dimension or attribute useful in obtaining information about an architecture desired by a user. The preferred five sections of the category dimension are a way to index and organize the data. The sections are:

Infrastructure—e.g. Mainframe's existing environment and components.

Hardware and Software Standards—e.g. Standard word processor is Microsoft Word 6.0™.

Procedures and Methodology—e.g. The procedure for software development is contained in the Standard Development Life Cycle methodology.

System Types—The types of systems that make up the organization's information architecture: e.g. Decision Support Systems.

Emerging Segments—The technology segments that have been selected as areas of research as they may have significant benefit and impact on the technical architecture e.g. XML and remote access.

Of course, the content dimension can be divided into different sections as needed.

As discussed, the content of the EAM web site can be visualized with three dimensions. These dimensions are the framework for all dimensions of the data, including content subject, detail level and time. Each piece of information is represented by a point within the three dimensions detailing one specific piece of content with a unique set of attributes. In the generic sense, this is a simple and structured view for a wide range of data. As clean as this representation of the data is, the dilemma is how navigate through it in a simple manner.

A portal is an entry point to specific data. Every portal provides a different entry into the informational space. However, the same information is available through each portal. Each portal is layered to provide certain information first, such as the detailed technical diagrams described above. Not only do portals provide a solution to disseminating information, but they are also the result of other drivers.

These drivers involve the basic nature of a user. In the traditional tree structure of Internet pages, users quickly find themselves mired in information, fighting the linear notion of the either a or b tree structure to get what they need (e.g., are you a manager or not, are you male or female, do you like fiction or not, etc). This structure covers a lot of information, but is cumbersome to the user.

Most people who experience such a site will leave frustrated. From this it has been recognized that it is best to keep sites shallow and wide, providing as many navigational options as possible from each page. All the information is available that the user could ever need (width) but only a few clicks are necessary to a specific piece (shallow depth). It is helpful if the number of levels of that the user must access to obtain a desired specific piece of information (content) is no more that about four although a higher number may be needed.

A portal allows a user access to the specific information they need on a web site quickly (shallow depth) with all the information contained by the different portals (width). The level of complexity of the site is the same as it would have been before portals, but fewer people are lost to confusion.

Navigation of the EAM site involves providing the user with as much relevant information as possible, as quickly as possible. Portals are only one way in which this site accomplishes this. Another method provides users with an index or site map. For users who know exactly what they are looking for, this index can facilitate sorting through the information. In addition, the index is a traditional tool of web based information. Experienced web surfers may find this the most comfortable way to locate specific content.

So far we have only detailed several general methods by which the EAM aids in navigation, and there are more. Below is a list of portal definitions which are examples of how one could provide access to the detailed technical information contained in the EAM site. In addition, we will discuss cases which highlight how a specific type of user may utilize the portals to find information quickly. These use cases and portal definitions help to further describe the navigational structure of the EAM web site.

The present invention provides a technocentric portal 300, as depicted in FIG. 11, designed for users who need detailed technical information. This portal is built on a conceptual drawing of the organization's technical infrastructure, and shows the relationships between system and network hardware at the summary type level. The portal is designed to help developers, contractors, and technology planners find detailed information regarding the technical environment. This information may include items such as the physical infrastructure (cable types, router types, network diagrams) as well as the procedures and methodologies associated with development on particular hardware (development on the mainframe, database development).

The content, time frame and level of detail included in this portal are preferably:

Content—Content may include network diagrams, security procedures, disaster recovery protocols, development procedures, inventory lists, and hardware and software standards.

Level of Detail—The portal defaults to a very detailed look at the technical architecture, but may be changed for users to moderate or low.

Time Frame—The time frame is focused on current architecture, but tactical and strategic information is available with one click.

A user would point and click the mouse to navigate into this portal by placing the pointer over the aspect of the technical architecture in which they are interested. This causes a component to pop-up a menu displaying the contents for the underlying information, such as depicted in FIG. 12. The user then selects from the menu which component they are interested in. In this way the site stays shallow, yet layers the information and provides the user as many choices as possible.

For example, the user moves over the Internet component as above, and pops up the menu containing the following choices: security, disaster recovery, performance management, development tools, infrastructure and inventory, hardware and software standards, and procedures and methodologies. The real piece of information the user needs is the development tools, so the user selects it. The next step is the loading of the subsequent page which discusses the development tools in place for the Internet. This could include a list of HTML editors preferred by the client, such as Homesite version 3, where to find a copy of the latest version, and a list of contacts for questions regarding authoring HTML. In addition, if the user wishes to further explore HTML, they may find a list of projects that their company is working on which include HTML aspects. Of course, this is just one example of the vast array of data available to users of this portal. Here it is important to note that all of the information regarding the enterprise architecture is available to the user through this portal, but the very detailed technical information is available first. This includes additional time frames, lower levels of detail and other subjects.

Figure 13B:
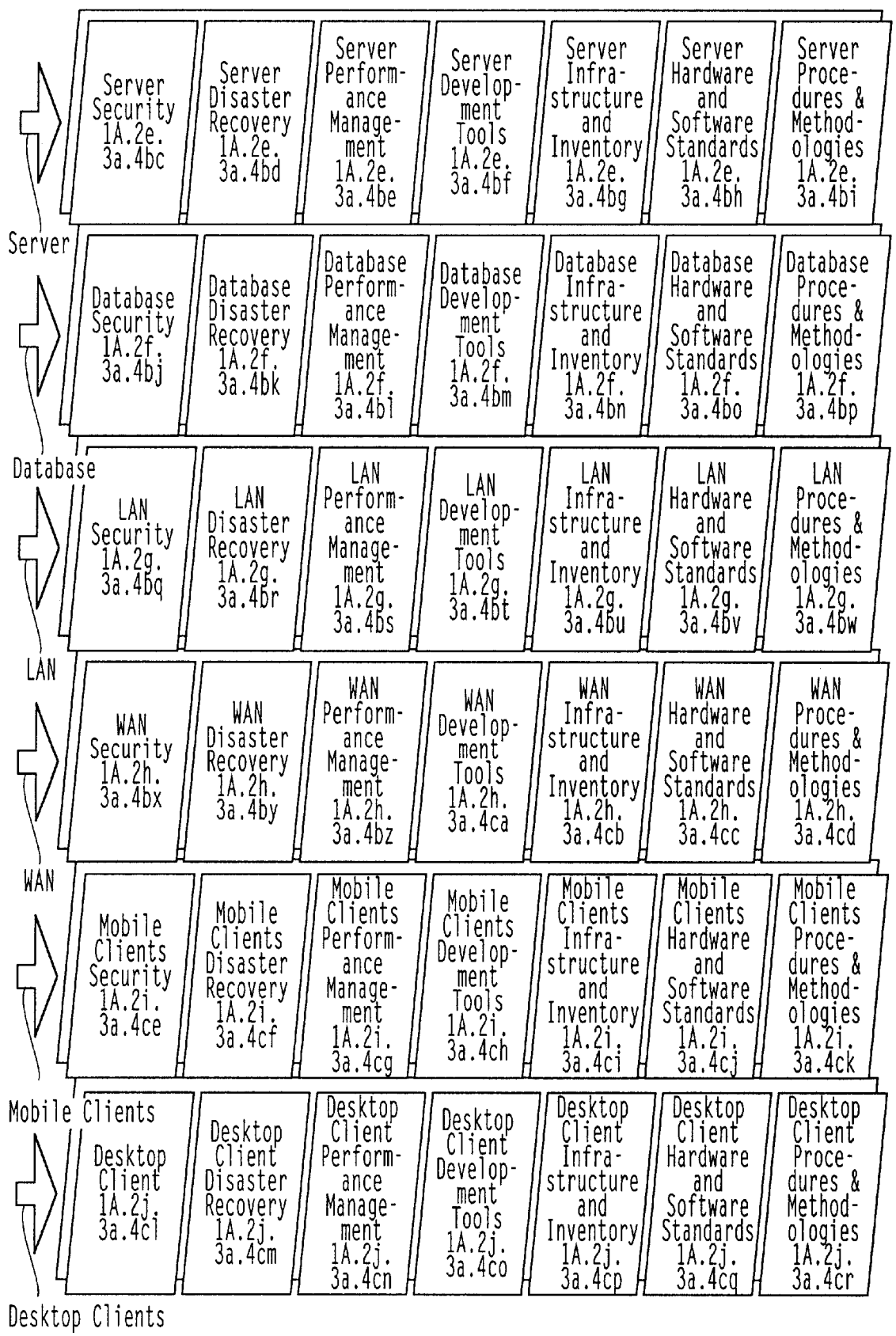
FIG. 13 shows information organization and relationships for the technocentric portal.

An example of how the content might flow is illustrated in FIG. 13. For the technocentric portal, as with the other portals, there is a diagram that illustrates the flow of information throughout the portal. These diagrams have a numbering schema not available to users that shows both navigation and information flow. The numbering scheme, which is used to depict the flow of information, is described below.

The first layer has a naming convention of 1X where the first place indicates the layer and X is A, B, C, or D. The EAM web site preferably contains four portals: technocentric, management and planning, development, enterprise architecture (FEA) that are labeled A, B, C, and D, respectively. The information diagrams start from the portal home page at 1X, where X=A, B, C, or D. For the technocentric portal, 1A represents the user presented with the technocentric portal graphic of FIG. 10, the first place where all the information in the technocentric portal can be accessed.

The second layer has a naming convention of 1X.2$y$ where the first place again indicates layer and y is any letter from a through z. This next level represents the first layer of information beneath the portal entrance. This layer is the options the user is presented with when they click a mouse over 1X. This layer of information flows directly from the home page of the portal, and then presents distinct options. For example, in the technocentric portal, a user places their mouse over 1A, and is then presented (a pop-up menu) with a drop down list of 1A.2$a$, Internet, 1A.2$b$, Extranet, 1A.2$c$, Intranet, and so on until the last option, 1A.2$j$, Desktop Clients. The user can then pick Internet, and, with one mouse click, is three layers deep in information.

The third layer has a naming convention of 1X.2$y$.3$z$ where z is any letter from a through z. The third layer of information, 1X.2$y$.3$z$, is a layer which presents the next logical set of options and information which come after level two. For example, in the technocentric portal, 1A.2$a$.3$a$, is the choice for Internet Security and all the other information options associated with Internet.

The fourth layer has a naming convention of 1X.2$y$.3$z$.4$ab$ where a and b are any letter from a through z. The fourth layer represents the most detailed information and flows from one specific piece of the third layer. For example, Internet Security is numbered 1A.2$a$.3$a$.4$aa$, and Internet Disaster Recovery is 1A.2$a$.3$a$.4$ab$. There is a sibling relationship among the layers that have the same first three layers. If there were 27 information groups in the Internet section, the 27th piece of information in layer four underneath 1A.2$a$.3$a$ would be 1A.2$a$.3$a$.4$ba$. The second variable, of 4$ab$, can be any letter between a and z. When the second variable reaches z, the first variable a becomes b. This numbering scheme is used at the fourth level is very detailed and this schema provides 676 options for information in the fourth level.

For example, a user needs to access information about the hardware and software standards of mobile clients. The user would first enter the technocentric portal 1A. From there, the user would choose mobile clients 1A.2$i$. To find the hardware and software standards, the user then chooses mobile clients, hardware and software standards, 1A.2$i$.3$a$. The user then needs more detailed information and arrives at 1A.2$i$.3$a$.4$cj$ for a table describing the current hardware and software standards required for mobile clients at the organization.

The technocentric portal is one of many possible views that could provide easy and intuitive access to the information contained in a EAM web site. Other options and other portals can be envisioned, but this one targets a specific user need: quick and easy access to detailed technical information.

Figure 14:
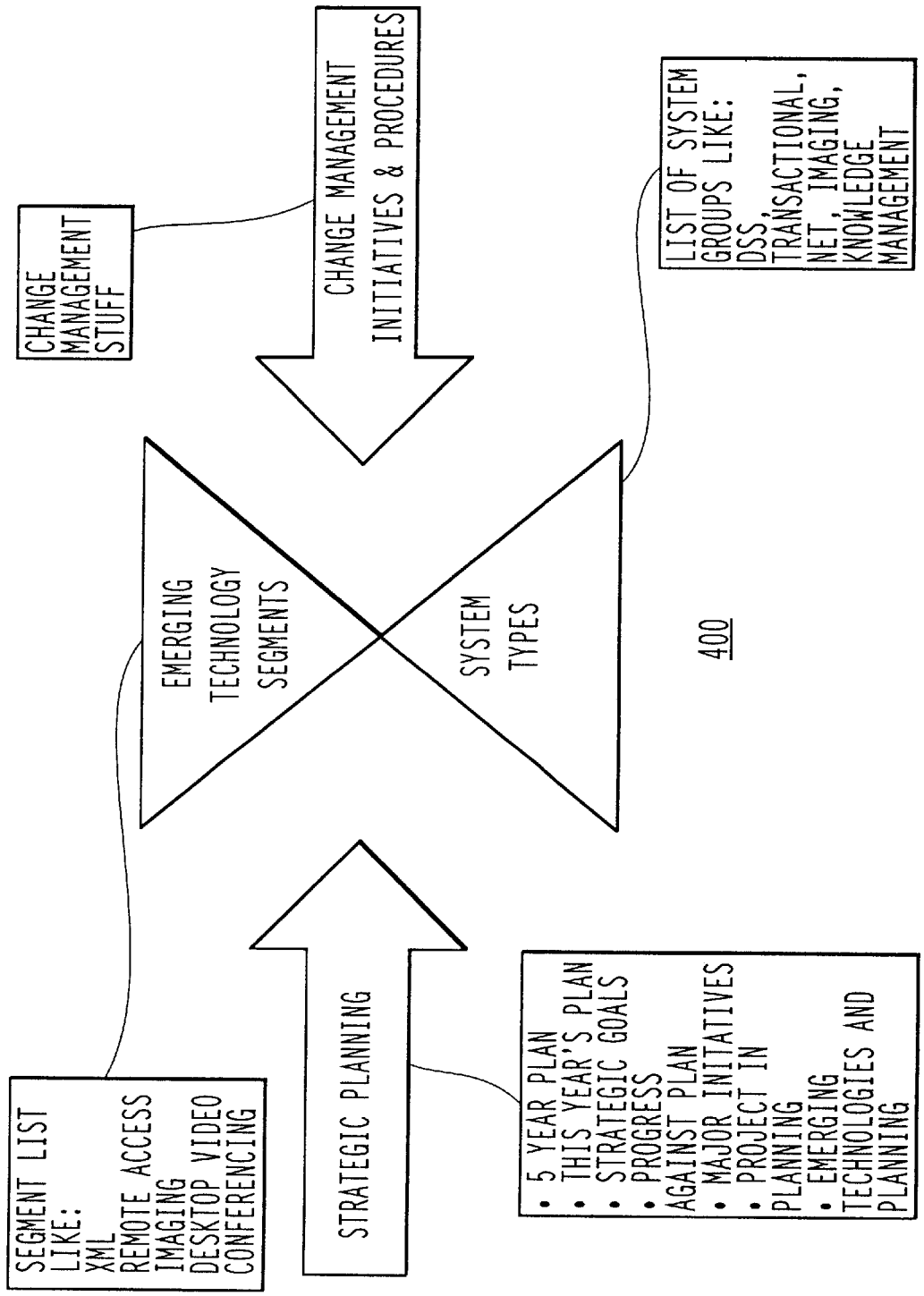
FIG. 14 depicts some of the information contained within a management and planning portal.

The second of the portals is the management and planning portal 400 depicted in FIG. 14 and which is designed for managers and planners who want to understand how enabling technology segments are resulting in changes in the technical architecture. This portal also presents information about the system groups across the organization to encourage communication and knowledge sharing. Finally, this portal contains information about the strategic information technology plan of the organization, and systems and technologies which may be part of the future strategic plan.

As with the other portals, this portal presents a combination of detail level, time frame, and type of content. This portal is designed to help managers and planners understand new technologies, use the most appropriate technologies to achieve business goals, and increase communication and knowledge across the organization.

The content, time frame and level of detail included in this portal 400 are preferably primarily:

Content—Content includes groups of systems, emerging technology segments, and change management procedures.

Level of Detail—The level of detail is designed for managers and planners. Higher levels of detail can be accessed if needed.

Time Frame—Time frame is focused on strategic, but tactical and current are available.

The call out boxes in the FIG. 14 are sample drop down lists of what mouse over items users could click on. Each section of the page is also navigable in time, like system types. The user will see information in the default strategic time frame. For example, content about system types will be a list of system types which will exist at the organization in three years and may currently be in the initial planning phase. The tactical time frame would include a list of system types which contains all of the applications and systems which will be in production in the six month to one year time frame. The current view of system types would be a list of the system types which exist today.

Figure 15:
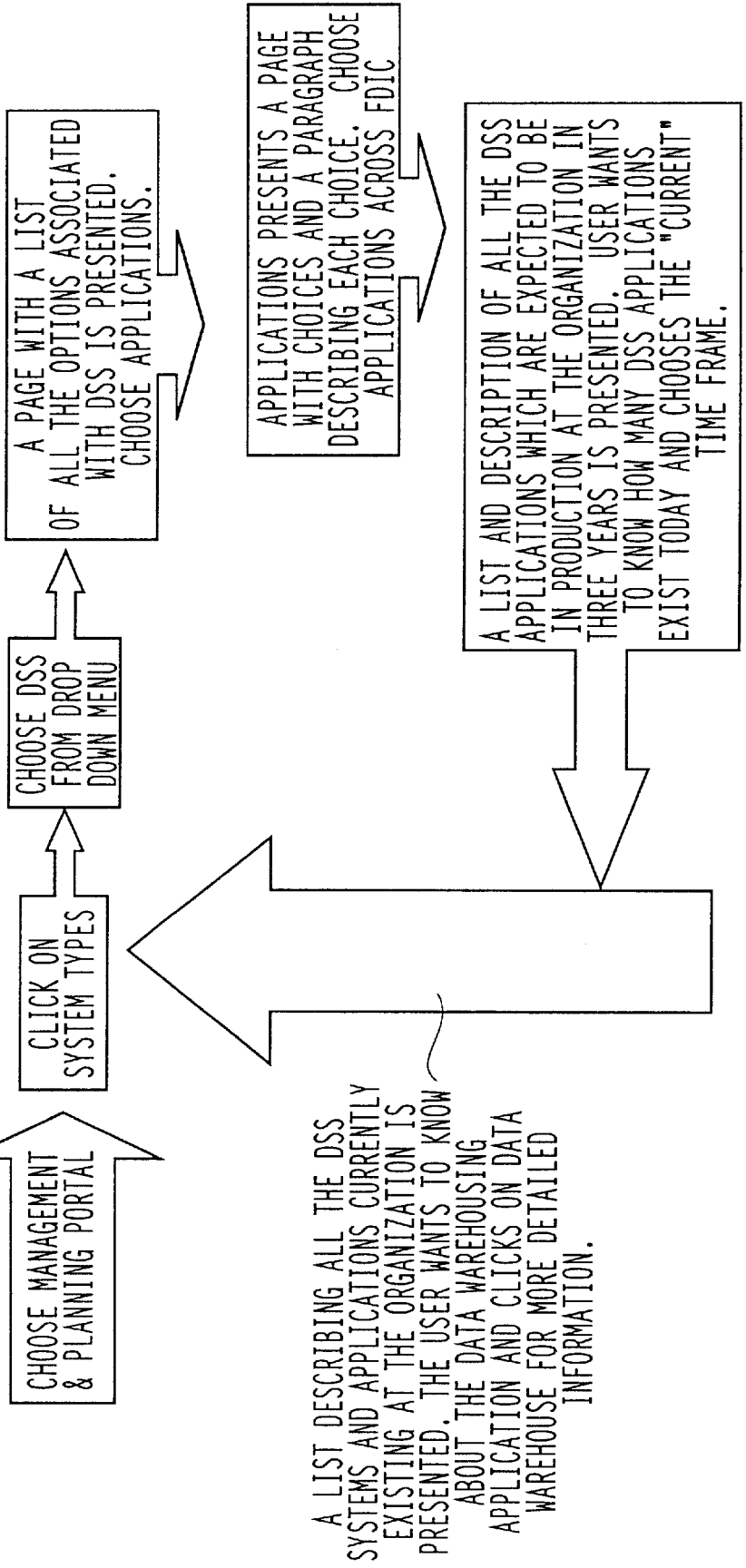
FIG. 15 shows a user path within the management and planning portal.

A possible path a user might take in the management and planning portal is shown in FIG. 15.

Figure 16A:
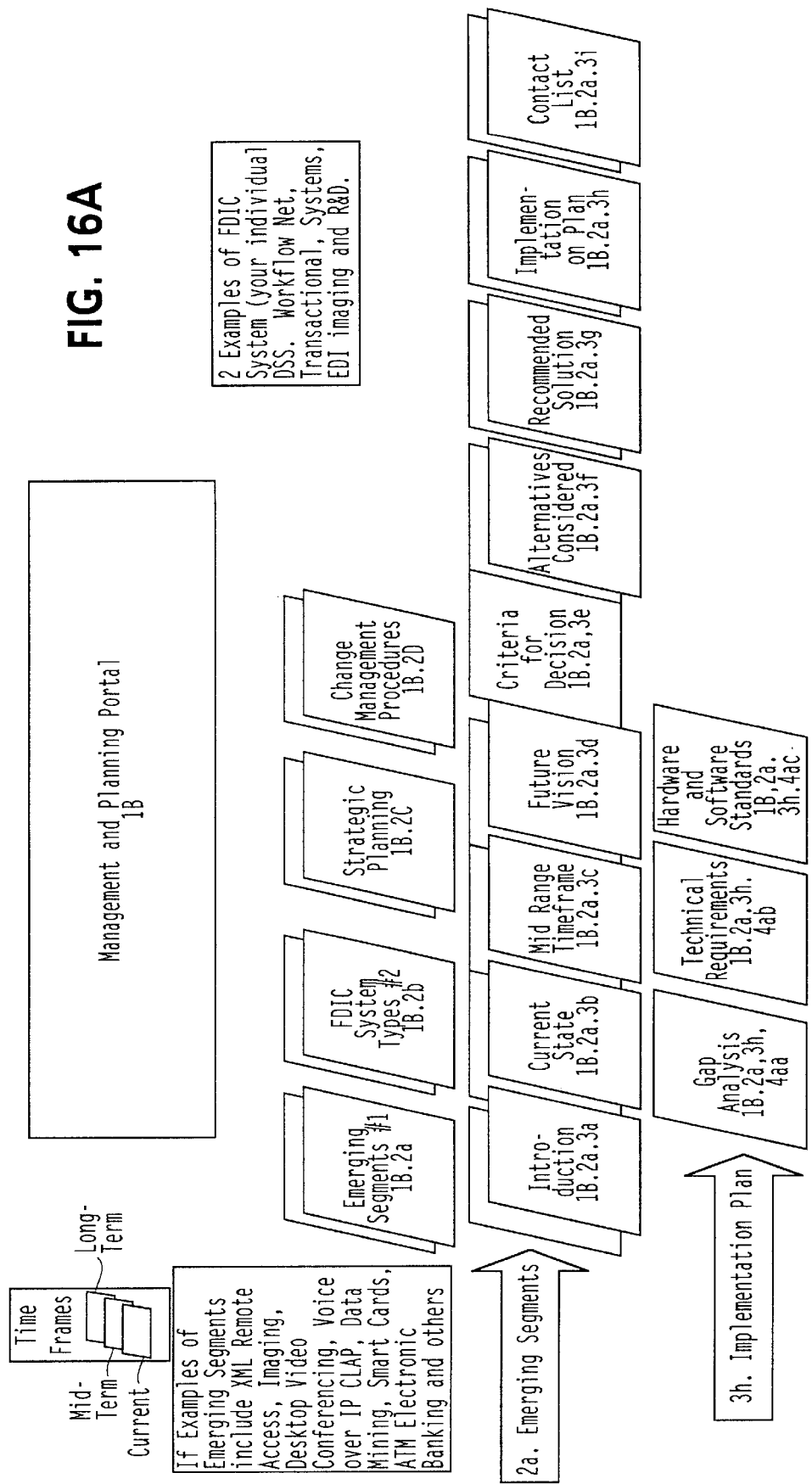
FIG. 16 shows information organization and relationships for the management and planning portal.
Figure 16B:
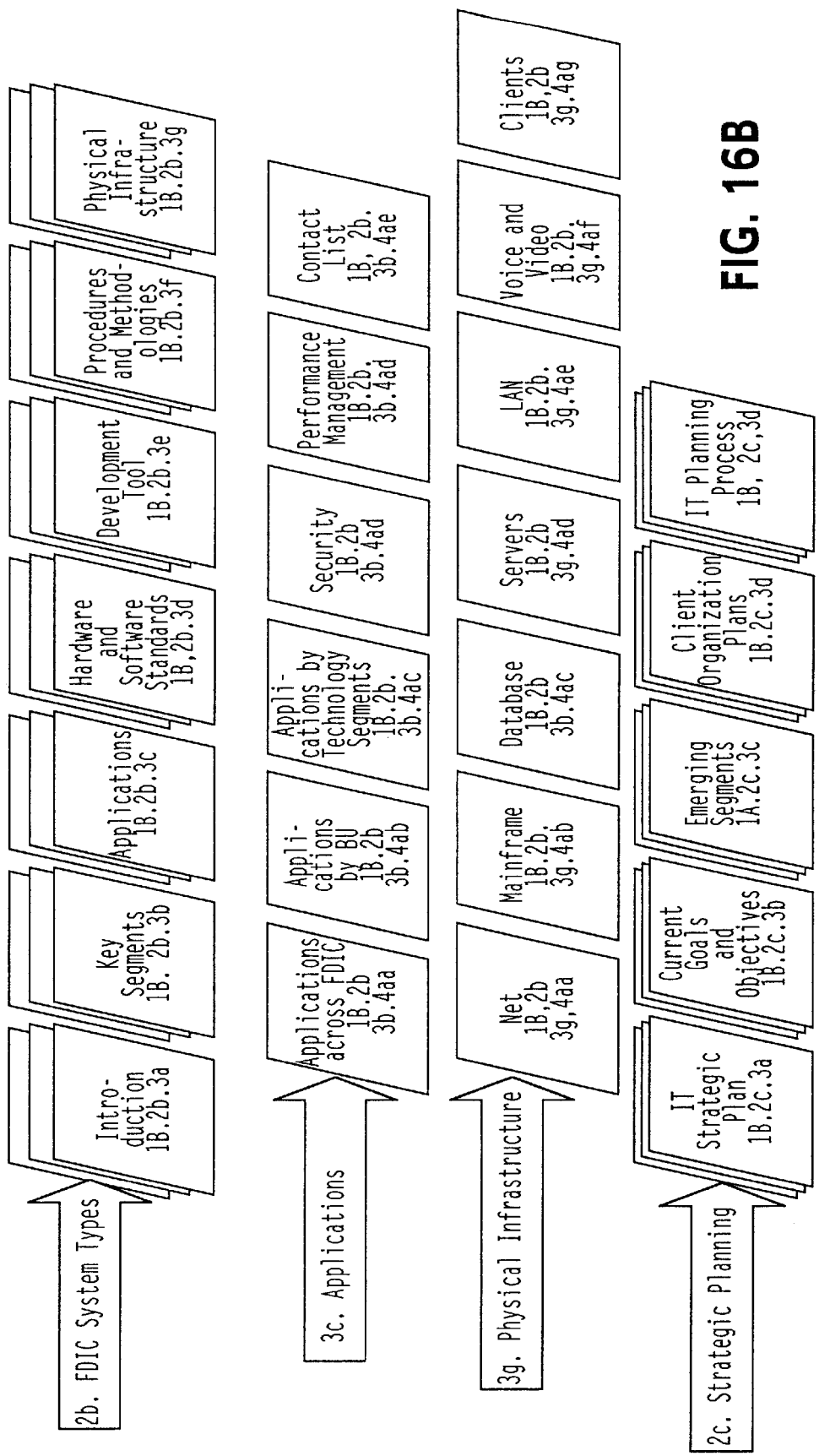

An example of how the content can be related in terms of parent child relationships is illustrated in FIG. 16. The diagram shows at the top level the four different groups of information that can be on the management and planning portal and how the content might flow from that point. The numbering scheme used in the management and planning portal is the same one used for technocentric.

Figure 17:
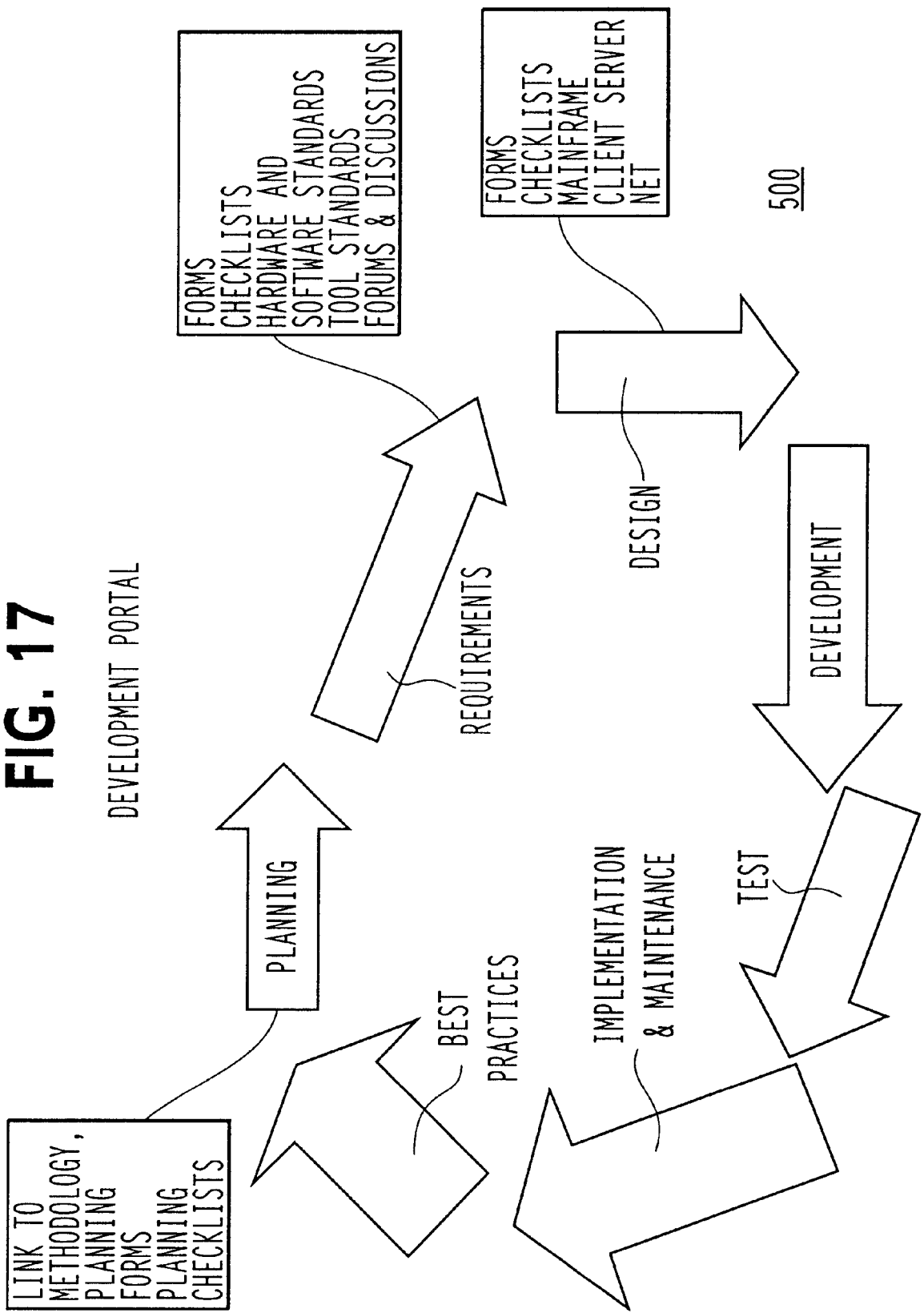
FIG. 17 depicts some of the information contained within a development portal.

The development portal 500, another portal, as depicted in FIG. 17, is designed for users who are developers and managers of development at the organization. The development portal 500 displays content about the procedures for development, stores forms that are filled out during each stage of development, and links to forums and discussions internally and externally which offer communication and knowledge sharing. The development portal allows developers across the organization to share information and knowledge about development, and encourage standards practices in development.

The development portal 500 is designed to make the developer's role easier by consolidating information into one place and encouraging communication and knowledge sharing so that the organization can capitalize on past development projects.

The content, time frame and level of detail included in this portal are preferably:

Content—Content includes primarily of procedures and methodology and infrastructure.

Level of Detail—Mid to high level of detail as the portal is designed for developers who need to know specific pieces of information.

Time Frame—Time frame is focused on current and tactical, some strategic time frames can be included.

This page 500 contains all the pieces of the standard system development life cycle with additional functionality in the common forms that can be accessed in this portal 500. These forms can be filled out on-line to reduce the re-entering of the same information in multiple places. Storing these forms in the development portal streamlines the development process and adds to the functionality of the EAM.

Once on the first page of the development portal 500 the user can choose to enter any of the phases of the life cycle. Depending on the phase, the user can find out different information, fill out the necessary forms, or talk with other people who have experience working on similar problems.

Figure 18:
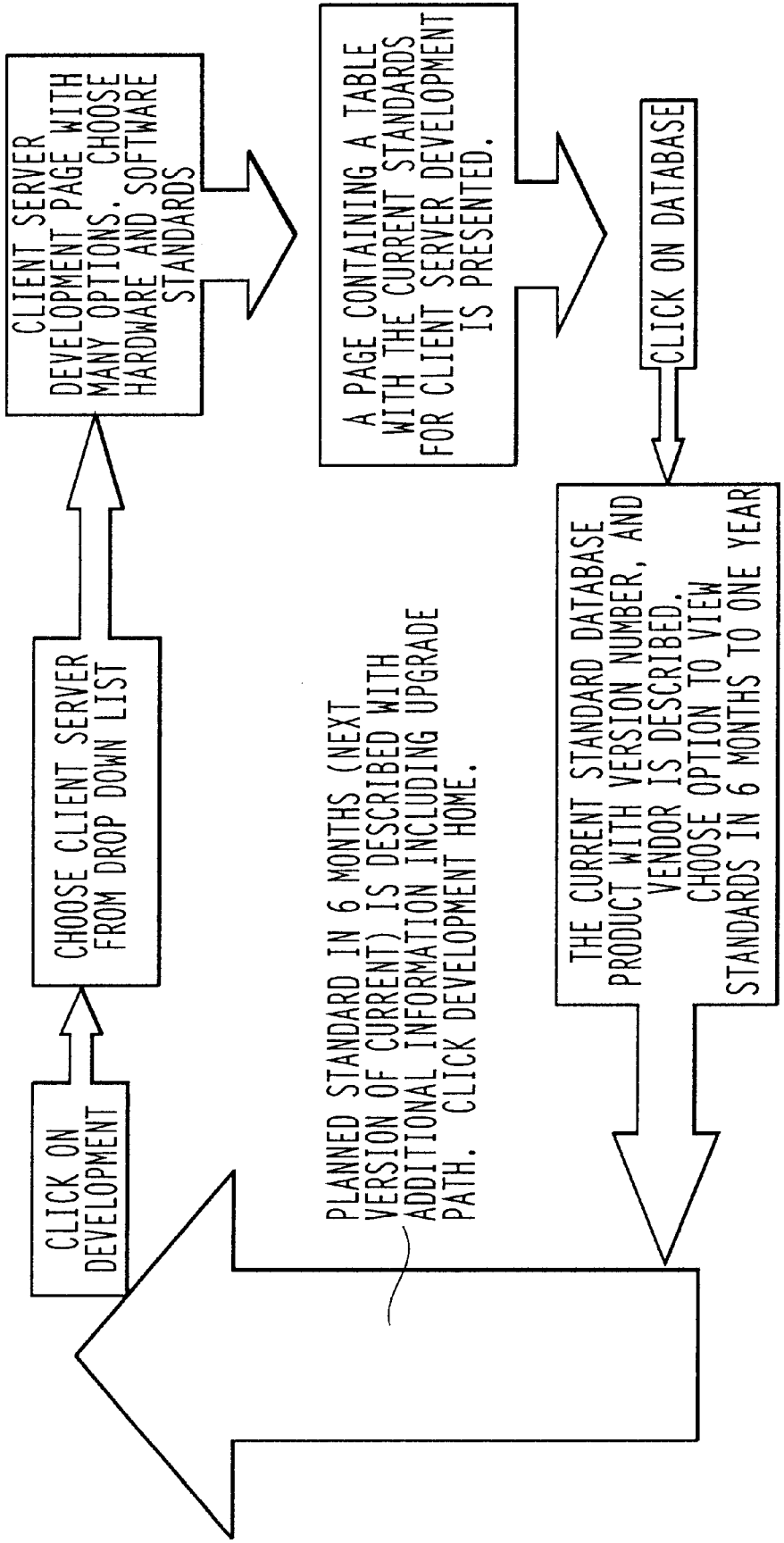
FIG. 18 shows a user path within the development portal.

While the portals present a limited number of options to the user initially, it is possible for users to access all the information in the web site from the portal. For example, a possible navigation is shown in FIG. 18. However, when the user chooses to see information about the database standards, the next choice could be to see the database environment in the organization which would allow the user to see information which is not directly an option in the development portal 500.

Figure 19A:
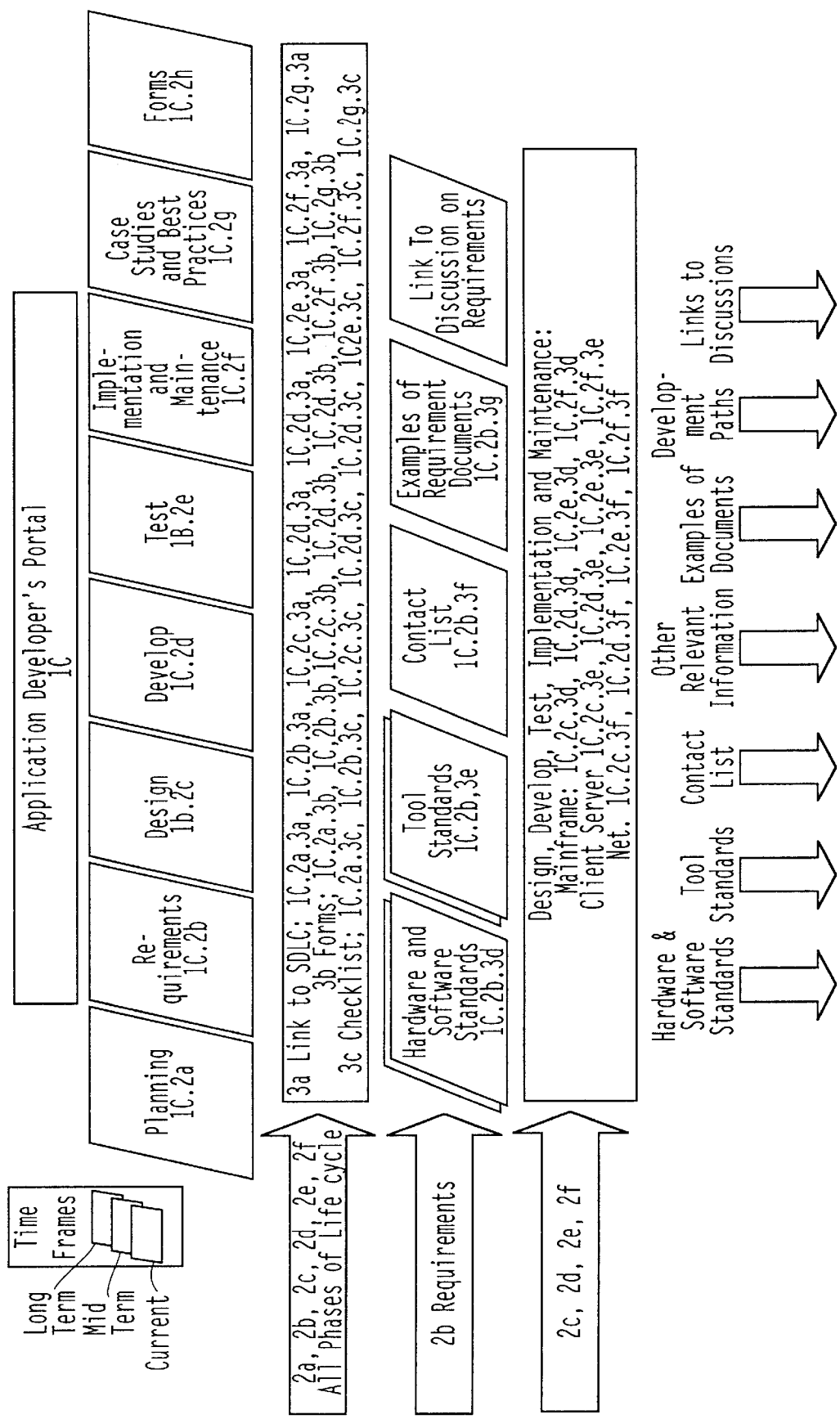
FIG. 19 shows information organization and relationships for the development portal.
Figure 19B:
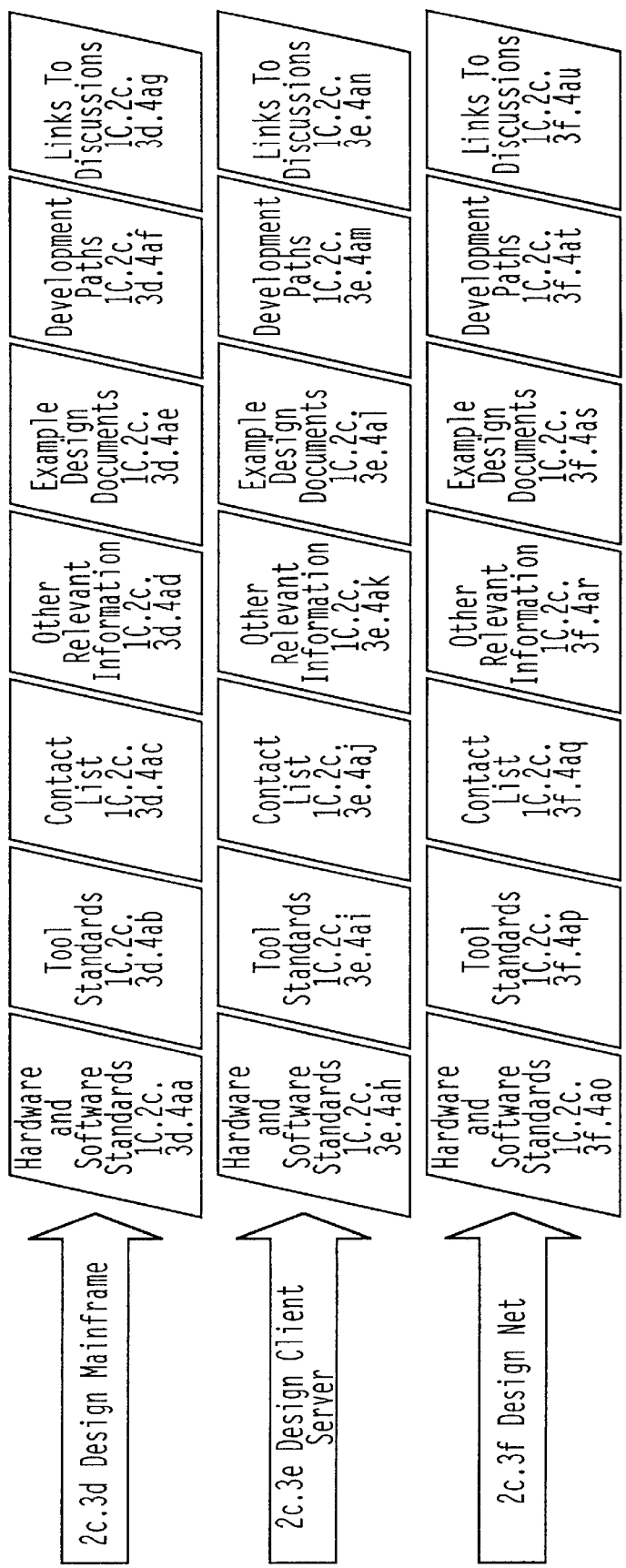

The development portal 500 has a number of preselected choices and drop down menus that determine the information flow. Certain options are presented which lead to other options within the portal. Users can choose to see different information that flows from other portals as they choose. FIG. 19 is an example of how the information might flow in the development portal 500. The numbering scheme used in the development portal is the same one used for technocentric portal 300.

Figure 20:
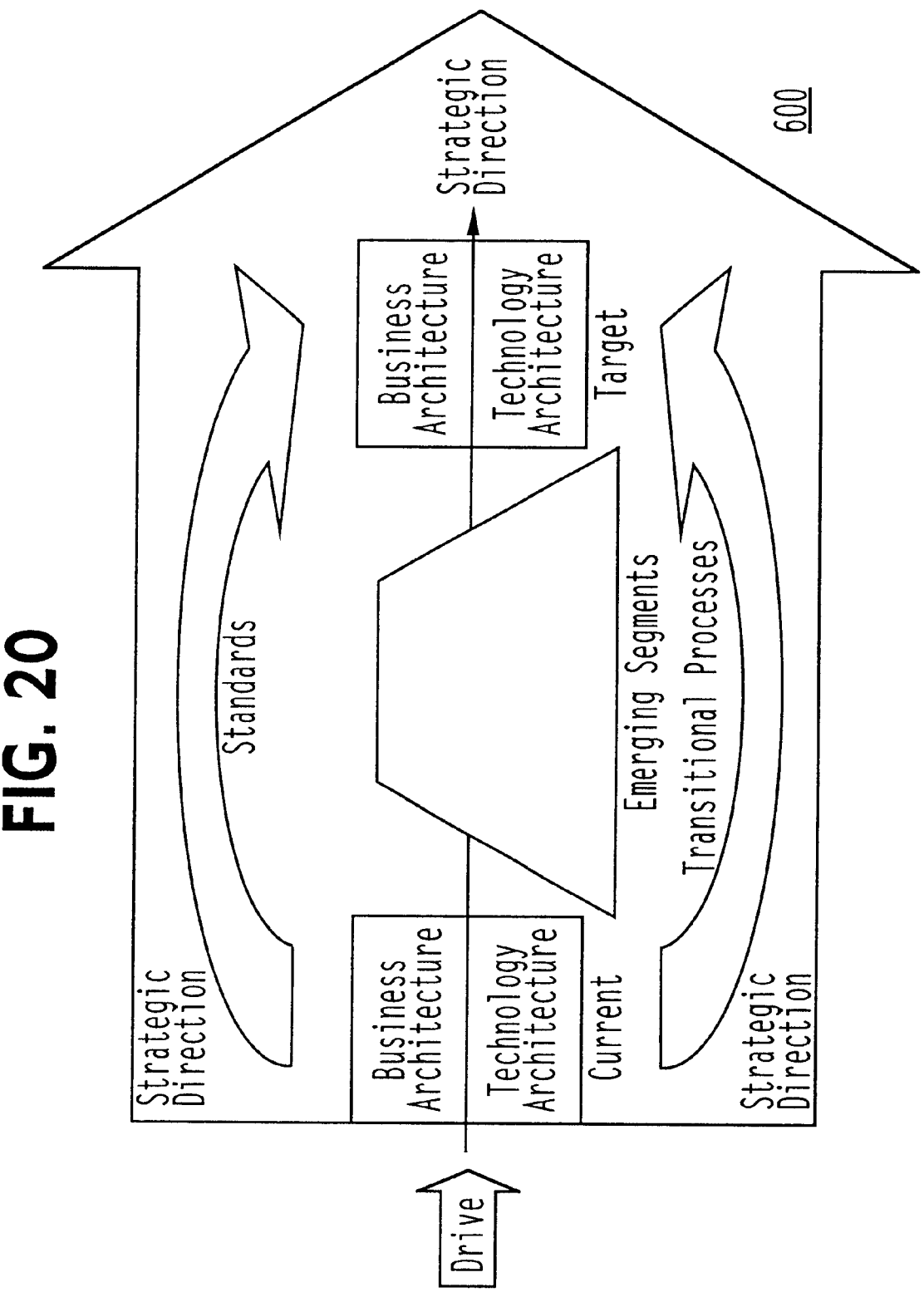
FIG. 20 shows a federal enterprise architecture (FEA) portal.

The fourth preferred portal 600, as depicted in FIG. 20, is called the federal enterprise architecture (FEA) portal. This portal 600 is based on a government standard for describing enterprise architectures. The diagram presented in the FEA portal provides a mechanism for discussing specific agency architecture efforts in a common framework across government agencies. This portal is useful for inter-organization information and resource sharing. By having one portal in the EAM that is common across other organizations the online architecture should also reduce assimilation time for employees and contractors who move from one place to another, who are already familiar with the model.

The content, time frame and level of detail included in this portal 600 are preferably:

Content—This portal provides easy access to the FEA identified content

Level of Detail—Because so much content is accessible from the portal, it is given at a mid to low level of detail Time Frame—This portal concentrates on the current time frame, but some sections include tactical and strategic time frames as well.

The user who chooses to view the portal 600 is presented with the above diagram. There are seven areas in the portal 600 that can be "drilled" into:

Drivers—This section contains information about technical drivers and business drivers. These drivers are external agents that create a need for a change in the target architecture. Examples of drivers would be changing business needs or important emerging technologies.

Current Architecture—This section explains the existing business and technical architectures for the agency.

Target Architecture—This section outlines the vision for the target business and technical architectures. This section is based on the current architecture and derived based on drivers, emerging technology segments, and overall strategic direction.

Emerging Segments—This section presents research on emerging technologies that may be of value for the agency.

Standards—This section defines standards for various sections of the architectures.

Transitional Processes—This section details the processes that guide the agency through the progression from current to target architecture.

Strategic Direction—This section guides the development of the architecture. It discusses the guiding principles for the development of the agency's architecture, as well as the agency's goals for the architecture and the general IT vision for the agency.

Figure 21A:
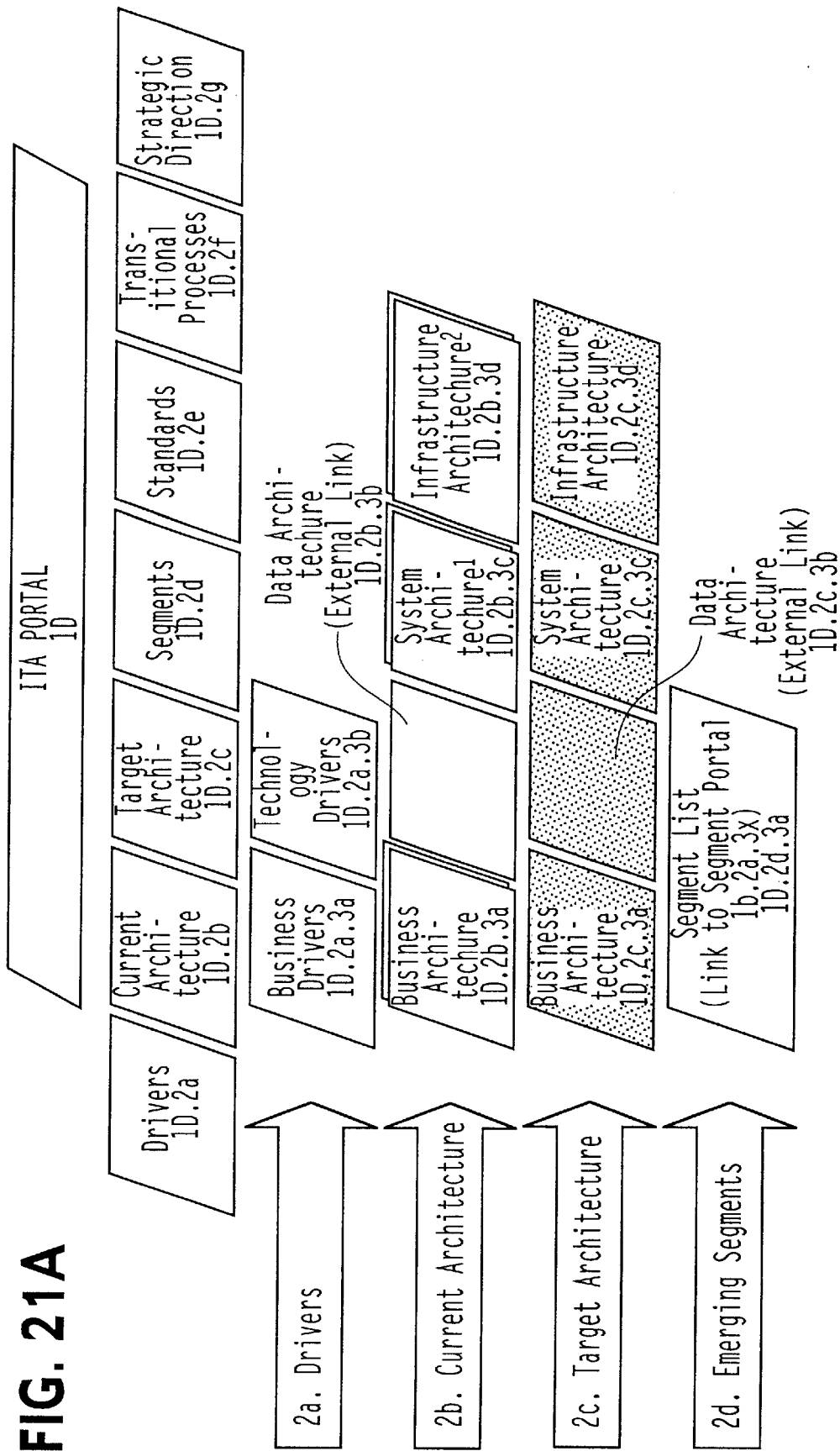
FIG. 21 shows information organization and relationships for the FEA portal.

FIG. 21 explores the paths a navigating user can take when entering through the portal 600. The numbering scheme used in the portal 600 is the same one used for technocentric portal 300.

Figure 22:
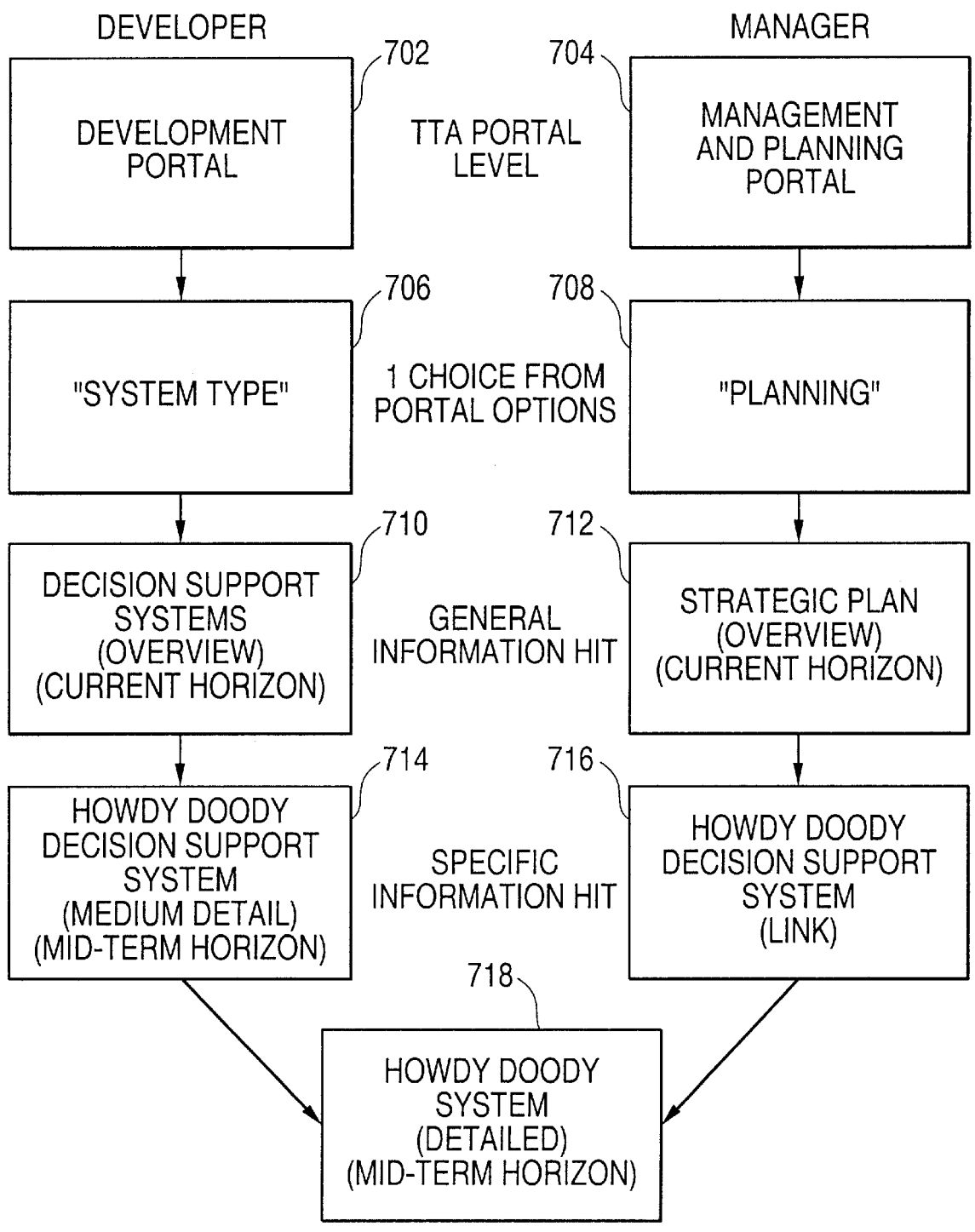
FIG. 22 illustrates two different paths to the same information starting from different portals.

Because the various portals operate off of the same database it is possible for two different users to obtain the same information through different portals. FIG. 22 shows such an example. In this example, a developer enters 702 through the development portal while a manager enters 704 through the management and planning portal. In the first choice within the portal the developer chooses 706 the system type option while the manager chooses 708 the planning option. Next, the developer selects 710 the decision support system while the manager selects 712 the strategic plan. At the next level both the developer and manager select 714 and 716 a particular decision support system and which results in the content 718 of that selection being provided to both users.

The EAM toolbox is a collection of items (icons or clickable spots) on a page that provide quick access to the functions of a web site. The EAM web site preferably contains items such as a search engine (to allow for a user to find a specific piece of content) and a site tutorial (to remind users of the functions of the web site). Such items are placed on every page within the EAM web site. Additional items preferably include the following:

Portal navigation—The ability to move between the portals would be provided by the portal navigation tool. An icon (or button) for each of the portals is one way of providing this. A user could use the portal navigation portion of the toolbox to choose a starting portal, choose a different portal than the one they are using, or to start at the home page of the portal in which they are currently.

Detail level navigation—Within each page, a user can select three different levels of detail: high, medium and low. Icons (or buttons) for the levels of detail can be used to set this attribute. If a user is viewing with a moderate level of detail, they may find a particular topic interesting and want more information, or may wish to reduce the information to executive summaries. The ability to navigate between these detail levels is provided by the detail navigation tool.

Time frame navigation—In addition to three detail levels, there are also three time frames for navigation: current, tactical (6–12 month) and strategic (1–3 year). Again, icons (or buttons) for the time frames can be used to implement this. A user could become interested in the future of a piece of the architecture after reading about the current state, or wish to find more about the current state after reading the future. The ability to navigate through the three time frames is provided by the time frame navigation tool.

Related content—When a user views a specific page, the contextual cross-reference tool gives the user the ability to navigate directly to other content sections that make use of or are closely related to the content he or she is currently viewing.

The items listed above, though offering different functions, all provide quick and easy access to the EAM's capabilities. For this reason, the items have been grouped together into a toolbox. The EAM Toolbox takes the idea of a traditional toolbar and breaks it down, placing the contents of the toolbar in more logical or graphically pleasing locations on a page.

The software architecture as described herein includes a relational database component as the primary content repository, with an application server component that performs the process of building XML document objects from the information contained in that relational database. The same functionality could be achieved through the use of other database structures such as an object database, which would store individual content objects as well as more complex structured objects such as XML document trees. The decision to use an object database rather than a relational database would in essence collapse two components (object assembly and data repository) into a single component. The information flow to the system applications and, ultimately, delivery to the client end of the process would not be impacted by the use of an object database, so the specified architecture includes any modification that would replace a relational database with an object database.

The present invention which involves separating content from presentation is described using XML. However the invention may be accomplished through other technologies, such as SGML, or other variations which enhance interoperability between content and presentation.

The invention as currently described dynamically assembles documents for presentation on-line, according to a structure defined in a document type definition (DTD). This DTD is tailored to describe the atomic components that comprise a technical architecture, in ways that facilitate the on-line presentation of information, intelligent searching, customization, and use of information by system applications. The same information that drives the on-line technical architecture could be rendered in other media, including (but not limited to) hard copy, CD-ROMs, aural presentation, electronic books, and on-line catalogs. Generating alternative renditions of the same technical architecture information components would require only specification of one or more new DTDs, or use of the same DTD with medium-specific formatting and rendering style sheets, each designed for the particular medium in question. The use of additional or alternative DTDs or style sheets to structure or present the information contained in the on-line technical architecture in no way alters the core system architecture, so the specified software architecture includes any variation on or addition of document formats that might be used.

Customization is also possible on a more individualized level, a level where the user fills out a profile describing the type of information they want so the site becomes customized to every user. The user might choose two portals and two sections from the portal that they need information on. For example, a user might only want to know information about the technical database environment, hardware and software standards for database, and any emerging technology segments which have to do with database. The user could then see this information updated as their EAM home page.

Customization may also be achieved through developing a smart manager that monitors user choices and adapts the user profile and portal accordingly.

The present invention has been described with respect to a system that is optimized for presenting and managing dynamic information. The invention can be extended to any other set of information that needs to be managed for reuse or re-purposing—such as a knowledge management system—or applied to any sources of information that can be divided and managed as atomic units and assembled and presented in varying constructs and contexts.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

```
XML DTD
<?XML version="1.0"?>
<!-- The root element, EAMdoc, is designed to be a single document
within the context of the EAM, meaning one complete, (dynamically)
assembled page, with associated outline structures and styles for
rendition -->
<!DOCTYPE EAMdoc [
<!-- The following parameter entities simply reduce the amount of
retyping, particularly with Attribute List declarations. -->
<!ENTITY % ident"
id              ID                      #REQUIRED">
<!ENTITY % about"
Name            CDATA                   #REQUIRED
Desc            CDATA                   #IMPLIED">
<!ENTITY % tracking"
Trigger         IDREF                   #IMPLIED
Owner           NMTOKEN                 #IMPLIED">
<!ENTITY % dates"
Created         CDATA                   #IMPLIED
Revdate         CDATA                   #IMPLIED">
<!-- Additional entities will be declared, either in this external subset, or
more likely in the internal subset of document instances, to provide
references to external unparsed entities such as graphic images. -->
<!ELEMENT EAMdoc (Outline)>
<!ATTLIST EAMdoc
%ident;
Outline         IDREF                   #REQUIRED
%about;
%tracking;
%dates;
Creator         CDATA                   #IMPLIED
Pubdate         CDATA                   #IMPLIED>
<!-- Outline is a structuring element containing one or more SuperSections
or Sections, with an associated rendition style sheet. ->
<!ELEMENT Outline (SuperSection | Section)+>
<!ATTLIST Outline
%ident;
Docid           IDREFS                  #IMPLIED
Class           CDATA                   #IMPLIED
```

APPENDIX -continued

```
Style sheet     CDATA                   #REQUIRED
%tracking;
%dates;
Revdate         CDATA                   #IMPLIED
Creator         NMTOKEN                 #IMPLIED
Timeline        NMTOKENS                #IMPLIED "current"
Detail          NMTOKENS                #IMPLIED "detailed">
<!-- A SuperSection element has an optional heading (title) and one or
more Sections. -->
<!ELEMENT SuperSection (Heading?, Section+)>
<!ATTLIST SuperSection
%ident;
%about;
%tracking;
%dates;>
<!-- A Section element has an optional heading (title) and one or more
SuperContent or Content elements. -->
<!ELEMENT Section (Heading?, (SuperContent | Content)+)>
<!ATTLIST Section
    %ident;
    %about;
%tracking;
%dates;>
<!-- A SuperContent element contains one or more Content elements. -->
<!ELEMENT SuperContent (Content+)>
<!ATTLIST SuperContent
%ident;
%about;
%tracking;>
<!-- A Content element is the building block of the EAM document, and
as such may contain any combination of plain text, lists, tables, keywords,
links, or images. -->
<!ELEMENT Content (#PCDATA | List | Table | Keyword | Reference | Image)*>
<!ATTLIST Content
%ident;
Source          IDREF                   #REQUIRED
%about;
%tracking;
Revdate         CDATA                   #IMPLIED
Timeline        NMTOKENS                #IMPLIED "current"
Detail          NMTOKENS                #IMPLIED "detailed">
<!-- Reference is a link which behaves, given the current state of
processing software, just as a standard hyperlink in HTML does; thus the
'simple' fixed attribute. It points to location using an absolute or
relative URI. -->
<!ELEMENT Reference (#PCDATA)>
<!ATTLIST Reference
xml:link        CDATA                   #FIXED "simple"
%ident;
%about;
URI             CDATA                   #REQUIRED
Type            (pointer | link | module)     #REQUIRED "link">
<!-- The Table definition in this declaration closely follows the
capabilities declared in the HTML 4.0 DTD, with the planned support for
CSS2 or XSL in forthcoming XML processors. The general data structure
of a EAM document suggests that tables will be used relatively
infrequently for presenting information, but the capability is nonetheless
included. -->
<!ELEMENT Table (Heading?, (Column* | Cols*), THeader?, TFooter?,
TBody+)>
<!ATTLIST Table
%about;
Type            (block | inline)        #IMPLIED "block">
<!-- Including elements for column and column groups (Cols) balances
potential table presentation capabilities, instead of limiting users to a
row-oriented state. Data in the table is stored and entered on a row by row
basis, however, so the Column element is empty. -->
<!ELEMENT Cols (Column*)>
<!ELEMENT Column EMPTY>
<!ATTLIST Column
Span            NMTOKEN                 #IMPLIED>
<!-- The THeader, TFooter, and TBody elements all simply contain one
or more rows; the difference is the placement, allowing rows to be
designated to come at the beginning or end of the table (or else in the
middle). -->
<!ELEMENT THeader (Row+)>
```

-continued

APPENDIX

```
<!ELEMENT TFooter (Row+)>
<!ELEMENT TBody (Row+)>
<!ELEMENT Row (Cell+)>
<!ATTLIST Row
Span         NMTOKEN            #IMPLIED>
<!ELEMENT Cell (#PCDATA | Content)*>
<!ATTLIST Cell
Colspan      NMTOKEN            #IMPLIED
Rowspan      NMTOKEN            #IMPLIED>
<!-- A Heading is plain text to be used as the title of a Table, Section, or
SuperSection. ->
<!ELEMENT Heading (#PCDATA)>
<!-- A List element consists of a style-dependent leading character, such as
a number or bullet with each of one or more list Items. -->
<!ELEMENT List (Item+)>
<!ATTLIST List
Type         (bullet | number | none)    #REQUIRED "bullet">
<!-- A single Item in a list may contain any combination of text, (nested)
lists, keywords, or links. This content model could be expanded to include
images and tables if necessary. -->
<!ELEMENT Item (#PCDATA | List | Keyword | Reference)*>
<!-- A keyword element contains plain text; if that text appears within a
link, the keyword tags should be placed as the innermost nested
element. -->
<!ELEMENT Keyword (#PCDATA)>
<!-- An Image element contains a source which is the name of a
previously declared entity; the entity declaration is strictly necessary to
provide the proper processing information for non-parsed external entities,
whether those are graphics, source code listings, audio files, etc -->
<!ELEMENT Image EMPTY>
<!ATTLIST Image
%ident;
Imgname      CDATA              #IMPLIED
Source       ENTITY             #REQUIRED>
<!-- Trigger corresponds to a reference table in the data model, listing
all triggers used in the EAM. Triggers themselves indicate an event,
perhaps usage or time-dependent, which would prompt a review of data
in the EAM. ->
<!ELEMENT Trigger EMPTY>
<!ATTLIST Trigger
%ident;
Trigdesc     CDATA              #IMPLIED
Message      CDATA              #IMPLIED
Trigdate     CDATA              #REQUIRED>
<!-- The following notation declarations are required, to provide the
complete set of NDATA values that may be attached to unparsed
entities. -->
<!NOTATION gif SYSTEM "ie.exe">
<!NOTATION jpeg SYSTEM "ie.exe">
<!NOTATION html PUBLIC "-//W3C//DTD HTML 4.0 EN" SYSTEM
"http://www.w3.org/Markup">
]>
```

What is claimed is:

1. A technical architecture management system, comprising:
    a content repository storing units of a technical architecture in a first format and storing relationships between the units, wherein the content includes an owner and expiration date, said content repository produces an update notification when the expiration date arrives and said system further comprises a message system sending a message to the owner indicating the content has expired; and
    an assembler accessing the units in said repository relevant to a user request, filtering the units responsive to the user request and presenting the units in a second viewable format.

2. A system as recited in claim 1, wherein said second format comprises one of hypertext mark-up language and extensible mark-up language.

3. A system as recited in claim 1, wherein the units are filtered using attributes of content type, time frame, and level of detail.

4. A system as recited in claim 3, wherein the attributes comprise unit subject matter, unit update date, and unit creation date.

5. A system as recited in claim 1, wherein the units are atomic information units.

6. A system as recited in claim 1, wherein the relationships include stored unit type, nature, use, commonality, shared use and interdependency.

7. An enterprise architecture management system, comprising:
    a portal allowing a user to specify a view of technical architecture content to be viewed; and
    a data storage and retrieval system retrieving the content specified responsive to a content type, level of detail, and time frame attributes, wherein the content includes an owner and expiration date, said data storage and retrieval system produces an update notification when the expiration date arrives and said system further comprises a message system sending a message to the owner indicating the content has expired.

8. An enterprise architecture management system, comprising:
    a browser interface allowing a user to specify a view of technical architecture content to be viewed; and
    a data storage and retrieval system retrieving the content specified responsive to a content level of detail and time frame attributes, wherein the content is separated into atomic information units, and wherein the content includes an owner and expiration date, said data storage and retrieval system produces an update notification when the expiration date arrives and said system further comprises a message system sending a message to the owner indicating the content has expired.

9. A system as recited in claim 8, wherein the level of detail attribute comprises low, medium and high.

10. A system as recited in claim 8, wherein the time frame attribute comprises current, tactical and long term.

11. A system as recited in claim 8, wherein the user specifies a view portal which includes an initial level of detail and an initial time frame.

12. A system as recited in claim 11, wherein each portal specifies a type of content.

13. A system as recited in claim 11, wherein the portal provides a view of content with at most four levels.

14. A system as recited in claim 8, wherein the users specifies one of a technocentric portal, a management and planning portal, a development portal and an enterprise architecture portal.

15. A system as recited in claim 14, wherein a same content can be retrieved using different portals.

16. A system as recited in claim 8, wherein the content is retrieved and displayed responsive to the identity of the user.

17. A system as recited in claim 16, wherein identity of the user corresponds to a profile and the content is retrieved and displayed responsive to the profile.

18. A system as recited in claim 17, wherein the profile specifies level of detail, time frame and content type.

19. A system as recited in claim 18, further comprising a toolbox through which the profile level of detail, time frame and content type can be selected.

20. A system as recited in claim 8, wherein the message is an e-mail message.

21. A system as recited in claim 8, wherein the message includes the content.

22. An enterprise architecture management system, comprising:
    a client processor including a browser interface allowing a user to specify a view of technical architecture content to be viewed by making a page request including at least two content specifying attributes;

a web server coupled to the client processor and relaying the page request;

an object server coupled to the web server, producing queries to obtain the content;

a database server responding to the queries with the desired content, the object server assembling the content into a web page which is supplied to said client processor and displayed by the browser interface, wherein the content includes an owner and expiration date, said server produces an update notification when the expiration date arrives and said server further comprises a message system sending a message to the owner indicating the content has expired.

23. A technical architecture management system, comprising:

a user interface allowing a user to specify a view of a technical architecture content via a portal comprising one of a technocentric portal, a management and planning portal, and a development portal, and a user profile specifying a time frame and a level of detail, and producing user request attributes;

a content repository storing atomic information units of the technical architecture in a first format and storing relationships between the units; and an assembler accessing the units in said repository relevant to a user request, filtering the units responsive to the user request attributes of time frame comprising current, tactical and long term, level of detail comprising low, medium and high detail, and content type, and presenting the units in a second viewable hypertext mark-up language format, wherein the content includes an owner and expiration date, said repository produces an update notification when the expiration date arrives, and said repository further comprises a message system sending a message to the owner indicating the content has expired.

24. A document view process, comprising:

allowing a user to specify a level of detail of a view of information descriptive of content of an enterprise technical architecture to be viewed, where the content comprises an owner and expiration date;

producing an update notification when the expiration date arrives and sending a message to the owner indicating the content has expired; and retrieving and displaying the enterprise technical architecture content responsive to the specified level of detail and time frame.

25. A process as recited in claim 24, wherein the content is divided into atomic information units.

26. A storage medium for controlling a computer and including a process of specifying a level of detail and time frame of technical architecture content to be retrieved where the content comprises an owner and expiration date;

producing an update notification when the expiration date arrives and sending a message to the owner indicating the content has expired; and retrieving and displaying the content specified responsive to the specified level of detail and time frame.

27. A method for navigating an electronic representation of the technical architecture of an enterprise, comprising:

storing an electronic representation of a multidimensional technical architecture having different levels of detail, time frames, an owner, and an expiration date;

automatically determining a level of detail corresponding to how a user uses the technical architecture;

displaying to the user a dynamic graphical view of the technical architecture based on the determined level of detail and a specified time frame of the architecture; and producing an update notification when the expiration date arrives and sending a message to the owner indicating the content has expired.

28. An enterprise architecture management system, comprising:

a browser interface allowing a user to specify a view of technical architecture content to be viewed; and a data storage and retrieval system retrieving the content specified responsive to a content level of detail and time frame attributes, wherein the content includes an owner and expiration date, said data storage and retrieval system produces an update notification when the expiration date arrives and said system further comprises a message system sending a message to the owner indicating the content has expired.

* * * * *

UNITED STATES PATENT AND TRADEMARK OFFICE
CERTIFICATE OF CORRECTION

PATENT NO. : 6,424,979 B1
DATED : July 23, 2002
INVENTOR(S) : Eric Bruce Livingston et al.

It is certified that error appears in the above-identified patent and that said Letters Patent is hereby corrected as shown below:

Column 5,
Line 37, change "user' " to -- users' --.

Column 7,
Line 32, change "user' " to -- users' --.

Signed and Sealed this

Nineteenth Day of November, 2002

Attest:

JAMES E. ROGAN
Attesting Officer                    Director of the United States Patent and Trademark Office